United States Patent
Ishikawa

(10) Patent No.: US 6,940,631 B2
(45) Date of Patent: Sep. 6, 2005

(54) OPTICAL MULTILAYER STRUCTURE, OPTICAL SWITCHING DEVICE, AND IMAGE DISPLAY

(75) Inventor: Hiroichi Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 677 days.

(21) Appl. No.: 09/897,571

(22) Filed: Jul. 2, 2001

(65) Prior Publication Data

US 2002/0070931 A1 Jun. 13, 2002

(30) Foreign Application Priority Data

| Jul. 3, 2000 | (JP) | ................................. 2000-200882 |
| Jul. 4, 2000 | (JP) | ................................. 2000-202831 |
| Jul. 19, 2000 | (JP) | ................................. 2000-219599 |

(51) Int. Cl.[7] ................ G02B 26/08; G02B 26/00
(52) U.S. Cl. ............. 359/291; 359/290; 359/223; 359/224
(58) Field of Search ................ 359/291, 290, 359/247, 318, 223, 224

(56) References Cited

U.S. PATENT DOCUMENTS

| 5,654,819 A | 8/1997 | Goossen et al. ............. 359/291 |
| 5,825,528 A * | 10/1998 | Goossen ....................... 359/291 |
| 5,835,255 A | 11/1998 | Miles ........................... 359/291 |
| 5,914,804 A | 6/1999 | Goossen ....................... 359/291 |
| 5,943,155 A | 8/1999 | Goossen ....................... 359/247 |
| 5,949,571 A | 9/1999 | Goossen et al. ............. 359/291 |
| 6,055,090 A | 4/2000 | Miles ........................... 359/291 |
| 6,580,481 B2 * | 6/2003 | Ueda et al. .................. 349/115 |
| 2001/0050707 A1 | 12/2001 | Sasaki et al. ................ 347/255 |

FOREIGN PATENT DOCUMENTS

| EP | 0 753 762 | 1/1997 |
| JP | 11 211999 | 8/1999 |
| JP | 2000 131629 | 5/2000 |
| WO | WO 99 52006 | 10/1999 |

* cited by examiner

Primary Examiner—Timothy Thompson
(74) Attorney, Agent, or Firm—Frommer Lawrence & Haug LLP; William S. Frommer

(57) ABSTRACT

An optical multilayer structure has a substrate, a light-absorbing first layer in contact with the substrate, a gap portion having a changeable size capable of causing an optical interference phenomenon, and a second layer. By changing the size of the gap portion, an amount of reflection, transmission, or absorption of incident light can be changed. For example, the substrate is made of carbon (C), the first layer is made of tantalum (Ta), and the second layer is made of silicon nitride ($Si_3N_4$). Also in a visible light area, high response is realized. Consequently, the optical multilayer structure can be suitably used for an image display. The optical multilayer structure may be obtained by stacking, on a substrate made of a metal such as chromium (Cr), a first transparent layer made of a material having a high refractive index such as $TiO_2$ (n=2.40), a second transparent layer made of a material having a low refractive index such as $MgF_2$ (n=1.38), a gap portion having a changeable size capable of causing an optical interference phenomenon, and a third transparent layer made of a material having a high refractive index such as $TiO_2$.

22 Claims, 44 Drawing Sheets $$Y = \frac{n_1^2}{n_s} \left( \frac{\lambda}{4} \text{ law} \right)$$

low reflectance side high reflectance side

OPTICAL MULTILAYER STRUCTURE, OPTICAL SWITCHING DEVICE, AND IMAGE DISPLAY

BACKGROUND OF THE INVENTION

1. Field of the Invention

The present invention relates to an optical multilayer structure having a function of reflecting, transmitting, or absorbing incident light, an optical switching device using the same, and an image display using the same.

2. Description of the Related Art

In recent years, importance of a display as a display device of video information is increasing. As a device for the display and, further, as a device for optical communication, an optical memory device, an optical printer, and the like, development of an optical switching device (light valve) operating at high speed is in demand. Conventionally, as devices of this kind, there are a device using a liquid crystal, a device using a micro mirror (digital micro mirror device (DMD), trade mark of Texas Instruments), a device using a diffraction grating (Grating Light Valve (GLV™) of Silicon Light Machines (SLM)), and the like.

A GLV is obtained by fabricating a diffraction grating with an MEMS (Micro Electro Mechanical Systems) structure, and a high speed light switching device of 10 ns is realized with an electrostatic force. The DMD performs switching of light by moving a mirror in the MEMS structure. Although a display such as a projector can be realized by using any of the devices, since the operation speed of each a liquid crystal and the DMD is slow, to realize a display as a light valve, the devices have to be arranged two-dimensionally, so that the structure becomes complicated. On the other hand, the GLV is of a high speed driving type. By scanning a one-dimensional array, a projection display can be realized.

However, the GLV has a diffraction grating structure and is therefore complicated, for example, since six devices have to be formed per pixel and diffracted rays emitted in two directions have to be converged to one by an optical system.

Light valves each of which can be realized with simple configuration are disclosed in U.S. Pat. Nos. 5,589,974 and 5,500,761. The light valve has a structure in which a translucent thin film having a refractive index of $\sqrt{n_s}$ is provided on a substrate (having a refractive index of $n_s$) via a gap portion (gap layer). In this device, the thin film is driven by using an electrostatic force to change the distance between the substrate and the thin film, that is, the size of the gap portion, thereby transmitting or reflecting a light signal. The refractive index of the thin film is $\sqrt{n_s}$ in contrast to the refractive index $n_s$ of the substrate. It is said that, by satisfying such a relation, light modulation of high contrast can be carried out.

A device having the configuration as described above, however, has a problem such that, when the refractive index $n_s$ of the substrate is not a large value like "4", the light valve cannot be realized in a visible light region. From the viewpoint of the structure, desirably, the translucent thin film is made of, a material such as silicon nitride ($Si_3N_4$) (having refractive index n=2.0). The refractive index $n_s$ of the substrate in this case is equal to four. In the visible light region, it is difficult to obtain such a transparent substrate and a choice of options of materials is narrow. At a wavelength for communication of infrared rays, the light valve can be realized by using germanium (Ge) (n=4). It seems difficult to apply the material for a use of a display in reality.

SUMMARY OF THE INVENTION

The invention has been achieved in consideration of the problems and a first object of the invention is to provide an optical multilayer structure having a simple configuration and a small structure, and having a variety of materials to be selected and realizing high response also in a visible light region, which can be suitably used for an image display or the like.

A second object of the invention is to provide an optical switching device and an image display each using the optical multilayer structure and realizing high response.

A first optical multilayer structure according to the invention comprises a substrate, a light-absorbing first layer, a gap portion having a changeable size capable of causing an optical interference phenomenon, and a second layer. Preferably, the first layer, the gap portion, and the second layer are stacked in accordance with this order on the substrate.

In the first optical multilayer structure, when a complex index of refraction of the substrate is $N_s$ ($=n_s - i \cdot k_s$, where $n_s$ denotes a refractive index, $k_s$ denotes an extinction coefficient, and i represents an imaginary unit), a complex index of refraction of the first layer is $N_1$ ($=n_1 - i \cdot k_1$, where $n_1$ denotes a refractive index, and $k_1$ denotes an extinction coefficient), a refractive index of the second layer is $n_2$, and a refractive index of an incident medium is 1.0, preferably, the relation of the following Expression (1) is satisfied.

$$\{(n_1-(n_2^2+1)/2)^2+k_1^2-((n_2^2-1)/2)^2\}\{(n_s-(n_2^2+1)/2)^2+k_s^2-((n_2^2-1)/2)^2\}<0 \quad (1)$$

A first optical switching device according to the invention comprises the first optical multilayer structure of the invention, and driving means for changing an optical size of the gap portion.

A first image display according to the invention is obtained by arranging a plurality of the first optical switching devices according to the invention one-dimensionally or two-dimensionally, for displaying a two-dimensional image by irradiating the optical switching device with light of three primary colors and scanning the light by a scanner.

In the first optical multilayer structure according to the invention, the size of the gap portion is changed in a binary manner or continuously between an odd multiple of $\lambda/4$ ($\lambda$: design wavelength of incident light) and an even multiple of $\lambda/4$ (including 0), thereby changing the amount of reflection, transmission, or absorption of incident light in a binary manner or continuously.

When the first optical multilayer structure according to the invention has a configuration including no gap portion, a substrate, a light-absorbing first layer formed in contact with the substrate, and a second layer formed in contact with a face of the first layer, on the side opposite to the substrate, it can be used as an antireflection film.

The first optical switching device according to the invention switches incident light when the optical size of the gap portion in the optical multilayer structure is changed by the driving means.

On the first image display according to the invention, when the plurality of optical switching devices arranged one-dimensionally or two-dimensionally with light, a two-dimensional image is displayed.

A second optical multilayer structure according to the invention comprises: a light-absorbing layer, portion, or substrate which does not transmit incident light or a transparent substrate; a first transparent layer made of a material having a low refractive index; and a second transparent layer made of a material having a high refractive index; the first and second transparent layers being stacked in accordance with this order on the layer, portion, or substrate or the transparent substrate; and a gap portion having a changeable size capable of causing an optical interference phenomenon, provided between the light-absorbing layer, portion, or substrate and the first transparent layer, or between the first and second transparent layers. In the second optical multilayer structure, preferably, a refractive index $n_m$ and an extinction coefficient $k_m$ (which is 0 in the case of the transparent substrate) of the light-absorbing layer, portion, or substrate or the transparent substrate satisfy the relations of the following expressions (2) and (3), respectively.

$$1 \leq n_m \leq 5.76 \qquad (2)$$

$$k_m \leq \sqrt{5.66-(n_m-3.38)^2} \qquad (3)$$

In the specification, the "material having a high refractive index" is a material having a refractive index of 2.0 or higher such as $TiO_2$ (n=2.4), $Nb_2O_5$ (n=2.1), or $Ta_2O_5$ (n=2.1). The "material having a low refractive index" is a material having a refractive index lower than 2.0 such as $MgF_2$ (n=1.38), $SiO_2$ (n=1.46), or $Al_2O_3$ (n=1.67).

A third optical multilayer structure according to the invention comprises: a light-absorbing layer, portion, or substrate which does not transmit incident light; a first transparent layer made of a material having a high refractive index; a second transparent layer made of a material having a low refractive index; a third transparent layer made of a material having a high refractive index; the first, second, and third transparent layers being stacked in accordance with this order on the layer, portion, or substrate, and a gap portion having a changeable size capable of causing an optical interference phenomenon, provided between the light-absorbing layer, portion, or substrate and the first transparent layer, between the first and second transparent layers, or between the second and third transparent layers. In the second optical multilayer structure, preferably, a refractive index $n_m$ and an extinction coefficient $k_m$ of the light-absorbing layer, portion, or substrate satisfy the relations of the following expressions (4) and (5), respectively, and do not satisfy the relations of the above-described expressions (2) and (3), respectively.

$$0.33 \leq n_m \leq 17.45 \qquad (4)$$

$$km \leq \sqrt{73.27-(n_m-8.89)^2} \qquad (5)$$

A second optical switching device according to the invention comprises the second optical multilayer structure of the invention and driving means for changing the optical size of the gap portion in the optical multilayer structure. A third optical switching device according to the invention has the third optical multilayer structure of the invention and driving means for changing the optical size of the gap portion in the optical multilayer structure.

A second image display according to the invention is obtained by arranging a plurality of the second optical switching devices according to the invention one-dimensionally or two-dimensionally, for displaying a two-dimensional image when the plurality of the second optical switching devices are irradiated with light of three primary colors.

A third image display according to the invention is obtained by arranging a plurality of the third optical switching devices according to the invention one-dimensionally or two-dimensionally, for displaying a two-dimensional image when the plurality of the third optical switching devices are irradiated with light of three primary colors.

In the second optical multilayer structure according to the invention, the optical size of the gap portion between the first and second transparent films is changed in a binary manner or continuously between an odd multiple of λ/4 and an even multiple of λ/4 (including 0), thereby changing the amount of reflection of incident light entering a side opposite to the light-absorbing layer, portion, or substrate which does not transmit incident light in a binary manner or continuously.

In the third optical multilayer structure according to the invention, the size of the gap portion between the first and second transparent layers is changed in a binary manner or continuously between an odd multiple of λ/4 and an even multiple of λ/4 (including 0), thereby changing the amount of reflection of incident light entering a side opposite to the light-absorbing layer, portion, or substrate which does not transmit incident light in a binary manner or continuously.

In the second and third optical switching devices according to the invention, the optical size of the gap portion in the optical multilayer structure is changed by driving means, incident light is switched.

In the second and third image displays according to the invention, by irradiating the plurality of optical switching devices of the invention arranged one-dimensionally or two-dimensionally with light, a two-dimensional image is displayed.

A fourth optical switching device according to the invention comprises: a transparent substrate made of a non-metallic material; a first transparent layer in contact with the transparent substrate; a gap portion having a changeable size capable of causing an optical interference phenomenon; and a second transparent layer, the first transparent layer, the gap portion, and the second transparent layers being stacked in accordance with this order on the transparent substrate, wherein when a refractive index of the transparent substrate is $n_s$, a refractive index of the first transparent layer is $n_1$, and a refractive index of the second transparent layer is $n_2$, the relation of $n_s < n_1$ and the relation of $n_1 > n_2$ are satisfied.

A fifth optical multilayer structure according to the invention comprises: a transparent substrate made of a non-metallic material; a first transparent layer in contact with the transparent substrate; a second transparent layer; a gap portion having a changeable size capable of causing an optical interference phenomenon; a third transparent layer; and a fourth transparent layer. The first and second layers, the gap portion, and the third and fourth transparent layers are stacked in accordance with this order on the transparent substrate. When a refractive index of the transparent substrate is $n_s$, a refractive index of the first transparent layer is $n_1$, a refractive index of the second transparent layer is $n_2$, a refractive index of the third transparent layer is $n_3$, and a refractive index of the fourth transparent layer is $n_4$, the relation of $n_s < n_1 < n_2 \approx n_3$ and the relation of $n_4 < n_1$ are satisfied.

A fourth optical switching device according to the invention comprises the fourth optical multilayer structure of the invention and driving means for changing the optical size of the gap portion in the optical multilayer structure. A fifth optical switching device according to the invention has the fifth optical multilayer structure of the invention and driving means for changing the optical size of the gap portion in the optical multilayer structure.

A fourth image display according to the invention is obtained by arranging a plurality of fourth optical switching devices of the invention one-dimensionally or two-dimensionally and displays a two-dimensional image by irradiating the optical switching devices with light of three primary colors, and scanning the light by a scanner.

A fifth image display according to the invention is obtained by arranging a plurality of the fifth optical switching devices of the invention one-dimensionally or two-dimensionally and displays a two-dimensional image by irradiating the optical switching devices with light of three primary colors, and scanning the light by a scanner.

In the fourth and fifth optical multilayer structures according to the invention, the size of the gap portion between the first and second transparent layers is switched between, for example, "λ/2" (λ: wavelength of incident light) and, preferably, "λ/4" and "0", thereby changing the amount of reflection or transmission of incident light entered from the transparent substrate side or a side opposite to the transparent substrate. In the fourth optical multilayer structure, by switching the size of the gap portion, an amount of reflection or transmission largely changes at a specific wavelength range (single wavelength). On the other hand, in the fifth optical multilayer structure, the characteristic of reflection or transmission which is almost uniform in a wide wavelength range is obtained.

In the fourth and fifth optical switching devices according to the invention, the optical size of the gap portion in the optical multilayer structure is changed by driving means, thereby switching incident light.

In the fourth and fifth image displays according to the invention, by irradiating a plurality of optical switching devices arranged one-dimensionally or two-dimensionally with light, a two-dimensional image is displayed.

Other and further objects, features and advantages of the invention will appear more fully from the following description.

DETAILED DESCRIPTION OF THE PREFERRED EMBODIMENTS

Figure 1:
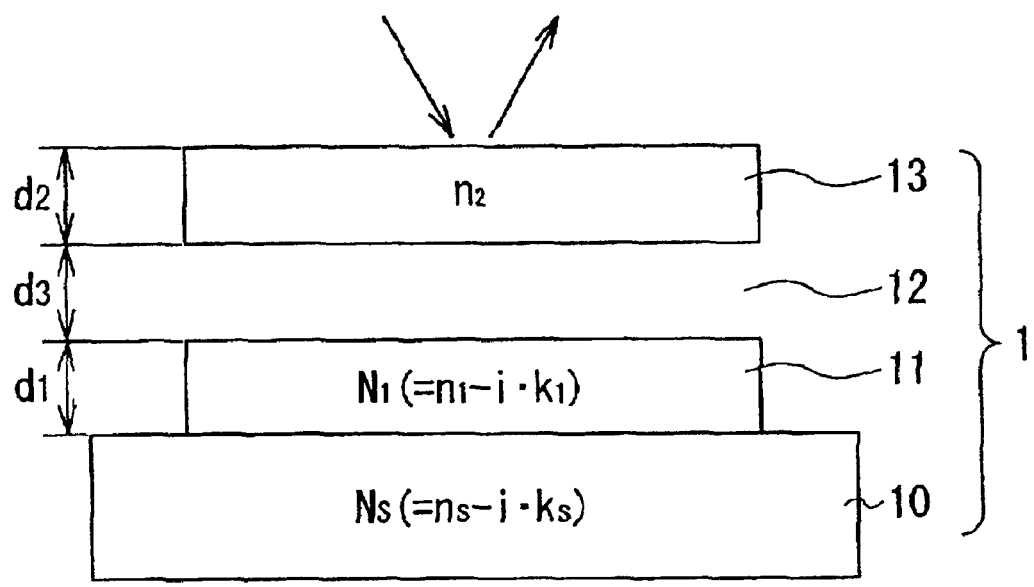
FIG. 1 is a cross section showing the configuration in a case where a gap portion in an optical multilayer structure according to a first embodiment is "λ/4".

Embodiments of the invention will be described in detail hereinbelow by referring to the drawings.

First Embodiment

Figure 2:
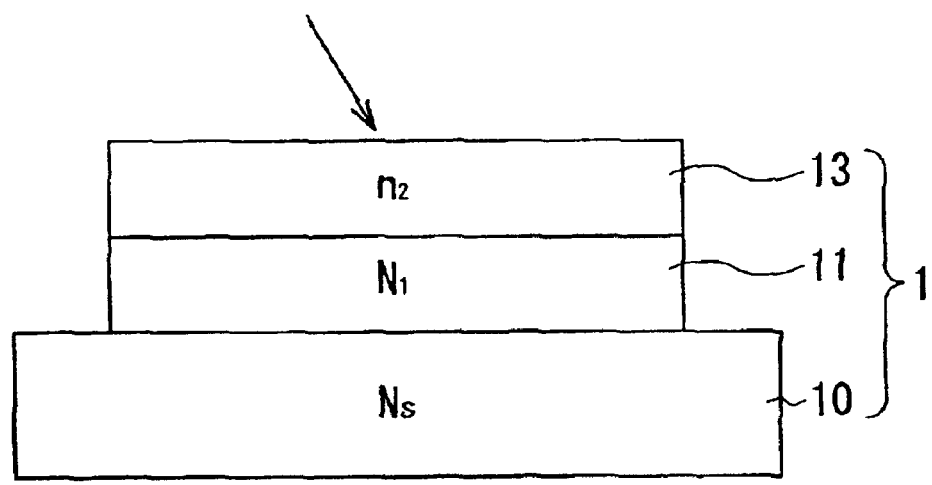
FIG. 2 is a cross section showing the configuration in the case where the gap portion in the optical multilayer structure illustrated in FIG. 1 "0"

FIGS. 1 and 2 show a basic configuration of an optical multilayer structure 1 according to a first embodiment of the invention. FIG. 1 shows a high reflectance state where a gap portion 12 described hereinlater in an optical multilayer structure 1 exists. FIG. 2 is a low reflectance state where there is no gap portion 12 of the optical multilayer structure 1. The optical multilayer structure 1 is used as, concretely for example, an optical switching device. By arranging a plurality of optical switching devices one-dimensionally or two-dimensionally, an image display can be constructed. As will be described in detail hereinlater, in the case of fixing the optical multilayer structure 1 in a structure as shown in FIG. 2, it can be used as an antireflection film.

The optical multilayer structure 1 is constructed by stacking, on a substrate 10, an optical-absorbing first layer 11 in contact with the substrate 10, the gap portion 12 having a changeable size capable of causing an optical interference phenomenon, and a second layer 13 in this order.

When a complex index of refraction of the substrate 10 is $N_s$ ($=n_s-i\cdot k_s$, where $n_s$ denotes a refractive index, $k_s$ denotes an extinction coefficient, and i represents an imaginary unit), a complex index of refraction of the first layer 11 is $N_1$ ($=n_1-i\cdot k_1$, where $n_i$ denotes a refractive index, $k_1$ denotes an extinction coefficient, and i represents an imaginary unit), a refractive index of the second layer 13 is $n_2$, and a refractive index of an incident medium is 1.0 (air), they are set so as to satisfy the following relation of Equation (6). The meaning will be described hereinlater.

$$1 \leq n_m \leq 5.76 \quad (6)$$

The substrate 10 may be made of an opaque, optical-absorbing material, e.g., a non-metal such as carbon (C) or graphite, a metal such as tantalum (Ta), a metal oxide such as chromium oxide (CrO), a metal nitride such as titanium nitride ($TiN_x$), a carbide such as silicon carbide (SiC), or a semiconductor such as silicon (Si), or may be obtained by forming a thin film made of an optical-absorbing material on a transparent substrate. The substrate 10 may be formed of a transparent material such as glass or plastic or a translucent material having a low extinction coefficient k.

The first layer 11 is an optical-absorbing layer and is made of a metal such as Ta, Ti, or Cr, a metal oxide such as CrO, a metal nitride such as $TiN_x$, a carbide such as SiC, a semiconductor such as silicon (Si), or the like.

The second layer 13 is made of a transparent material such as titanium oxide ($TiO_2$) ($n_2=2.4$), silicon nitride ($Si_3N_4$) ($n_2=2.0$), zinc oxide (ZnO) ($n_2=2.0$), niobium oxide ($Nb_2O_5$) ($n_2=2.2$), tantalum oxide ($Ta_2O_5$) ($n_2=2.1$), silicon oxide (SiO) ($n_2=2.0$), stannic oxide ($SnO_2$) ($n_2=2.0$), ITO (Indium-Tin Oxide) ($n_2=2.0$), or the like.

Since the second layer 13 acts as a movable portion in a switching operation as will be described hereinlater, it is preferably made of a strong material having a high Young's modulus such as $Si_3N_4$. In the case of driving the layer by static electricity, it is sufficient to include a transparent conductive film made of ITO or the like in a part of the second layer 13. Since the refractive index of $Si_3N_4$ and that of ITO are equal to each other, their thicknesses are arbitrary. When the first layer 11 and the second layer 13 are in contact with each other, it is desirable to make the substrate side of the second layer 13 of $Si_3N_4$ and make the incident medium side of ITO so as to prevent electric short-circuiting at the time of contact.

A physical thickness $d_1$ of the first layer 11 is determined by the wavelength of incident light, values n and k of the material of the layer, and optical constants of the substrate and the second layer 13 and is, for example, a value in a range about 5 to 60 nm.

An optical thickness $n_2 \cdot d_2$ of the second layer 13 is equal to or smaller than "λ/4" (λ denotes a design wavelength of incident light) in the case where the substrate 10 is made of a transparent material such as carbon, graphite, carbide, or glass and the first layer 11 is made of a material having a high extinction coefficient $k_1$ such as tantalum (Ta). When the substrate 10 is made of a transparent material such as carbon, graphite, carbide, or glass and the first layer 11 is made of a material having a low extinction coefficient $k_1$ such as silicon (Si), an optical thickness $d_2$ of the second layer 13 is larger than "$\lambda/4$" and smaller than "$\lambda/2$" for the following reason. Since the locus of optical admittance in the case where the first layer 11 is made of Si moves upward in an admittance diagram, an intersection between the first layer 11 and the second layer 12 is positioned upper than a real axis (positive side on an imaginary axis).

The film thicknesses $d_1$ and $d_2$ do not have to be strictly "$\lambda/4$" and "$\lambda/2$", but may be about the values. For example, when one of the optical layers is thicker than $\lambda/4$, it can be compensated by reducing the thickness of the other layer. When the refractive index is deviated from the equation (6) more or less, in some cases, it may be adjusted by the film thickness. In such a case, each of $d_1$ and $d_2$ is deviated from $\lambda/4$ more or less. The above is also applied similarly to the other embodiments. In the specification, the expression of "$\lambda/4$" includes "approximately $\lambda/4$".

Each of the first and third layers 11 and 13 may take the form of a composite layer constructed by two or more layers having optical characteristics different from each other. In this case, the optical characteristics (optical admittance) of the composite layer have to be equivalent to those in the case of a single layer.

The gap portion 12 is set to that its optical size (the interval between the first layer 11 and the second layer 13) can be varied by driving means described hereinlater. A medium filling the gap portion 12 may be gas or liquid as long as it is transparent. Examples of the gas are air (having a refractive index $n_D=1.0$ with respect to sodium D ray (589.3 nm)), nitrogen ($N_2$) ($n_D=1.0$) and the like. Examples of the liquid are water ($n_D=1.333$) silicone oil ($n_D=1.4$ to 1.7), ethyl alcohol ($n_D=1.3618$), glycerin ($n_D=1.4730$), diiodomethane ($n_D=1.737$), and the like. The gap portion 12 may be in a vacuum state.

The optical size of the gap portion 12 changes in a binary manner or continuously between "an odd multiple of $\lambda/4$" and "an even multiple of $\lambda/4$ (including 0)". Accordingly, the amount of reflection, transmission, or absorption of incident light changes in a binary manner or continuously. Like the case of the first and second layers 11 and 13, even when the optical size is slightly deviated from a multiple of $\lambda/4$, it can be compensated by a slight change in the film thickness or refractive index of the other layer. Consequently, the expression of "$\lambda/4$" includes "approximately $\lambda/4$".

Figure 3A:
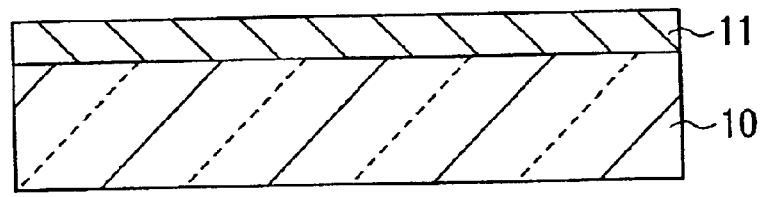
FIGS. 3A to 3D are cross sections for explaining a manufacturing process of the optical multilayer structure shown in FIG. 1.
Figure 3B:
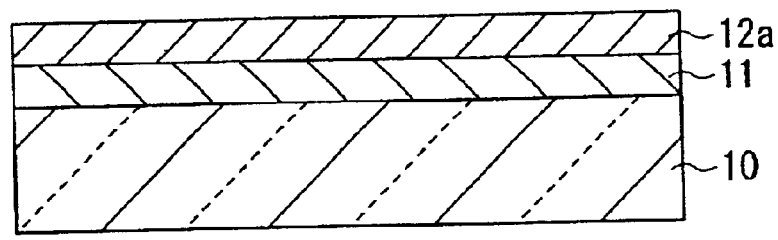
Figure 3C:
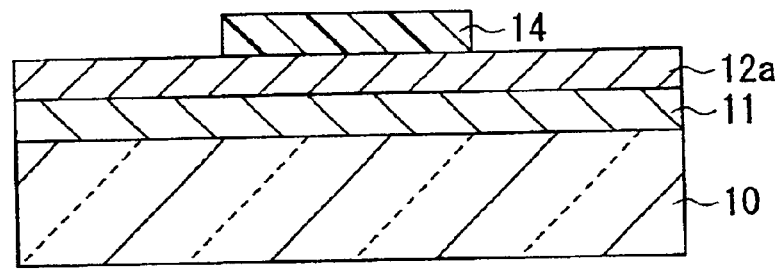
Figure 3D:
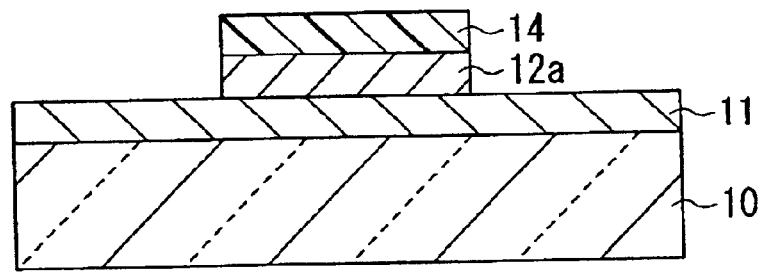

The optical multilayer structure 1 having the gap portion 12 can be formed by a manufacturing process shown in FIGS. 3A to 3D and FIGS. 4A to 4C. First, as shown in FIG. 3A, on the substrate 10 made of carbon or the like, the first layer 11 made of Ta is formed by, for example, sputtering. Subsequently, as shown in FIG. 3B, an amorphous silicon (a-Si) film 12a is formed as sacrifice layer by, for example, CVD (Chemical Vapor Deposition). As shown in FIG. 3C, a photoresist film 14 having a pattern of the shape of the gap portion 12 is formed. As shown in FIG. 3D, the photoresist film 14 is used as a mask and the amorphous silicon (a-Si) film 12a is selectively removed by, for example, RIE (Reactive Ion Etching).

Figure 4A:
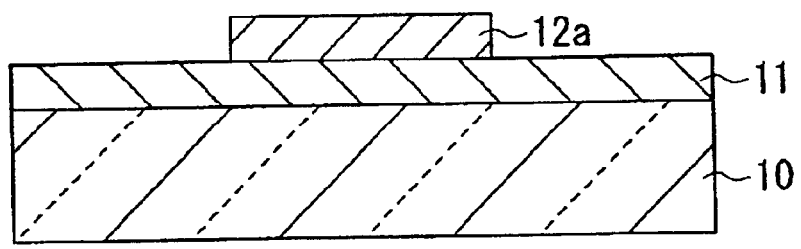
FIGS. 4A to 4C are plan views for explaining a process subsequent to the process of FIGS. 3A to 3D.
Figure 4B:
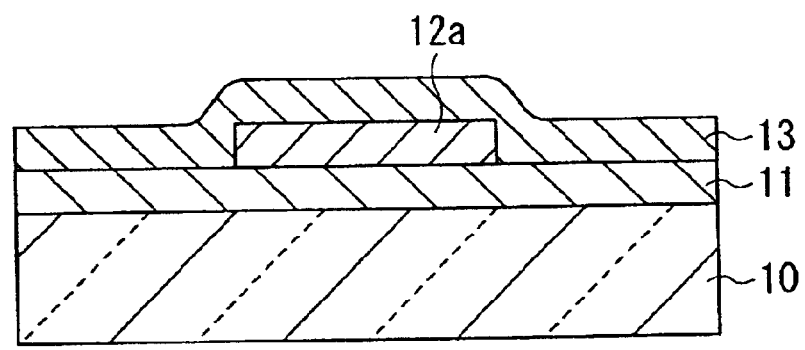
Figure 4C:
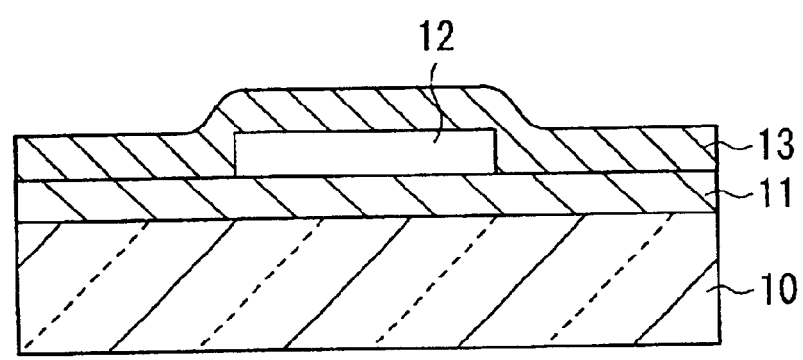

After removing the photoresist film 14 as shown in FIG. 4A, the second layer 13 made of $Si_3N_4$ is formed by, for example, sputtering as shown in FIG. 4B. As shown in FIG. 4C, the amorphous silicon (a-Si) film 12a is removed by dry etching. In such a manner, the optical multilayer structure 1 having the gap portion 12 can be manufactured.

In the optical multilayer structure 1, by changing the optical size of the gap portion 12 between an odd multiple of $\lambda/4$ and an even multiple of $\lambda/4$ (including 0) (for example, between "$\lambda/4$" and "0") in a binary manner or continuously, an amount of reflection, transmission, or absorption of incident light is changed.

By referring to FIGS. 5A and 5B and FIGS. 6A and 6B, the meaning of Equation (6) will be described.

The filter characteristic of the optical multilayer structure 1 as described above can be explained by optical admittance. Optical admittance y is equal to a complex index N of refraction ($=n-i\cdot k$, where n denotes a refractive index, k denotes an extinction coefficient, and i represents an imaginary unit). For example, the admittance of air is y(air)=1, and n(air)=1. The admittance of glass is y(glass)=1.52 and n(glass)=1.52.

Figure 5A:
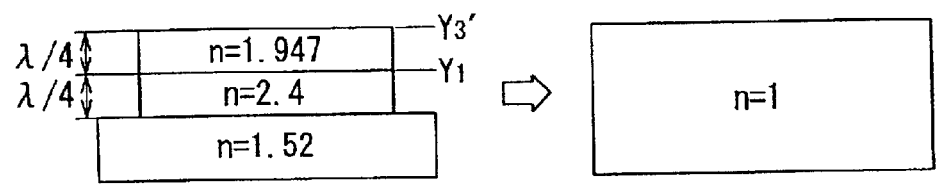
FIGS. 5A and 5B are diagrams for explaining characteristics in the case where a gap portion in an optical multilayer structure using a transparent substrate and a transparent film is "0".
Figure 5B:
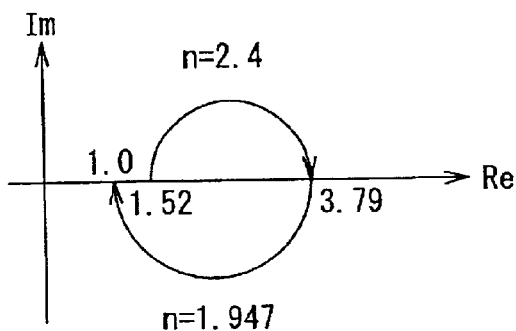

When a transparent optical film is formed on a transparent substrate, on an optical admittance diagram as shown in FIG. 5B, a locus moves while drawing a circular arc as the film thickness increases. The lateral axis indicates the real axis ($R_e$) of the admittance and the vertical axis indicates an imaginary axis ($I_m$) of the admittance. For example, when $TiO_2$ of n=y=2.40 or the like is formed on a glass substrate of n=y=1.52, the locus of composite optical admittance moves while drawing a circular arc from the point of y=1.52 as the film thickness increases. When the optical film thickness of $TiO_2$ is $\lambda/4$, the locus of the composite admittance returns to the point of $2.4^2/1.52$, that is, the point of 3.79 ($\lambda/4$ law). This is the composite admittance in the case where the $TiO_2$ film (first layer) having the thickness of $\lambda/4$ is formed on a glass substrate (transparent substrate). When the structure is seen from above, it is as if an integral substrate having n=3.79 is seen. The reflectance R is calculated as 33.9% by the following expression (7) on the interface with air.

$$R=(n-1/n+1)^2 \tag{7}$$

When a film of, for example, n=y=1.947 is formed only by an optical film thickness of $\lambda/4$ on the optical multilayer structure, on the optical admittance diagram, the locus moves clockwise from the point of 3.79. The composite admittance becomes Y=1.0 and is at the point of 1.0 on the real axis. Specifically, it is equivalent that the composite admittance=composite refractive index is 1.0, that is, it becomes equivalent to that of air. Consequently, no reflection occurs on the interface and the film can be regarded as what is called a V-coat anti-reflection film.

Figure 6A:
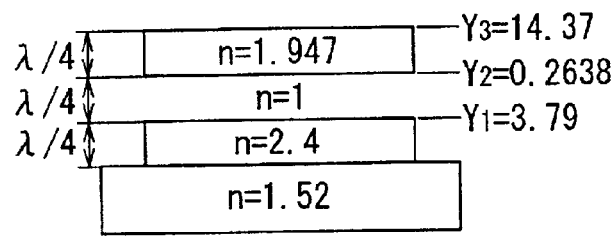
FIGS. 6A and 6B are diagrams for explaining characteristics in the case where the gap portion of the optical multilayer structure using the transparent substrate and the transparent film is "λ/4".
Figure 6B:
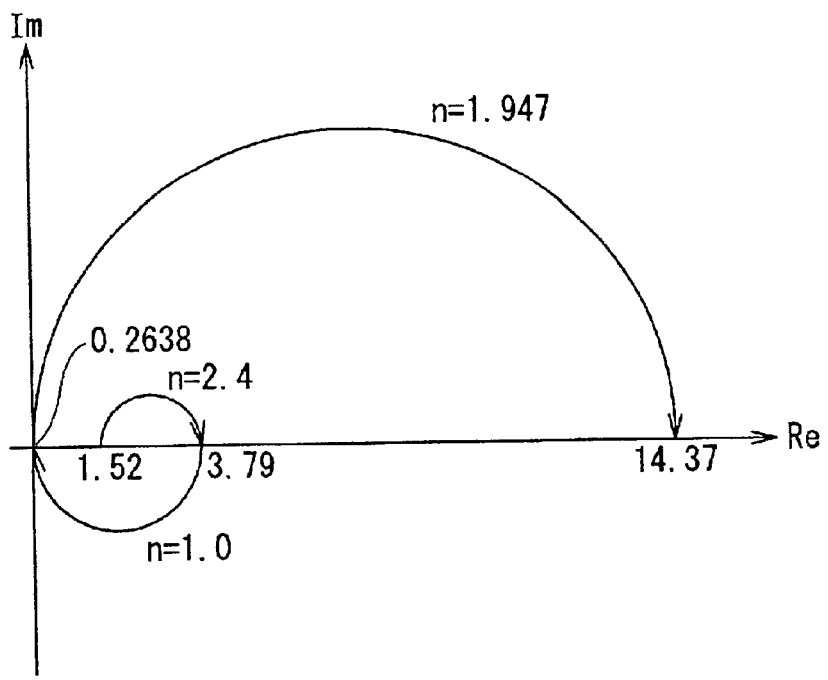

When the gap portion having n=1 (air) is provided only by the optical film thickness of $\lambda/4$ on the $TiO_2$ film (n=2.4), the composite admittance becomes $Y_2=0.2638$ as shown in FIGS. 6A and 6B. Further, when the film of n=y=1.947 having the optical film thickness of $\lambda/4$ exists on the gap portion, the composite admittance becomes $Y_3=14.37$, and the locus is positioned at the point of 14.37 on the real axis. The reflectance R at this time is determined by substituting $Y_3=14.37$ into "n" in the above Equation 4 and is calculated as 76%. From the above, it is understood that the reflectance changes from "0%" to "76%" as the optical film thickness of the gap portion (air layer) 12 is changed from "0" to "$\lambda/4$".

The case where a transparent layer ($TiO_2$) which does not absorb light is formed on a substrate made of a transparent material such as glass has been described above. In the complex index of refraction $N=n-i\cdot k$ (where n denotes a refractive index, k denotes an extinction coefficient, and i indicates an imaginary unit), k is equal to zero in any of the materials. In contrast, in the embodiment, at least the first layer 11 out of the substrate 10 and the first layer 11 is made of an optical-absorbing material such as an opaque metal material, metal oxide, or the like. That is, k is not equal to zero in the complex index $N_1$ of refraction of the first layer 11. The features of the embodiment will now be described hereinbelow.

Figure 7:
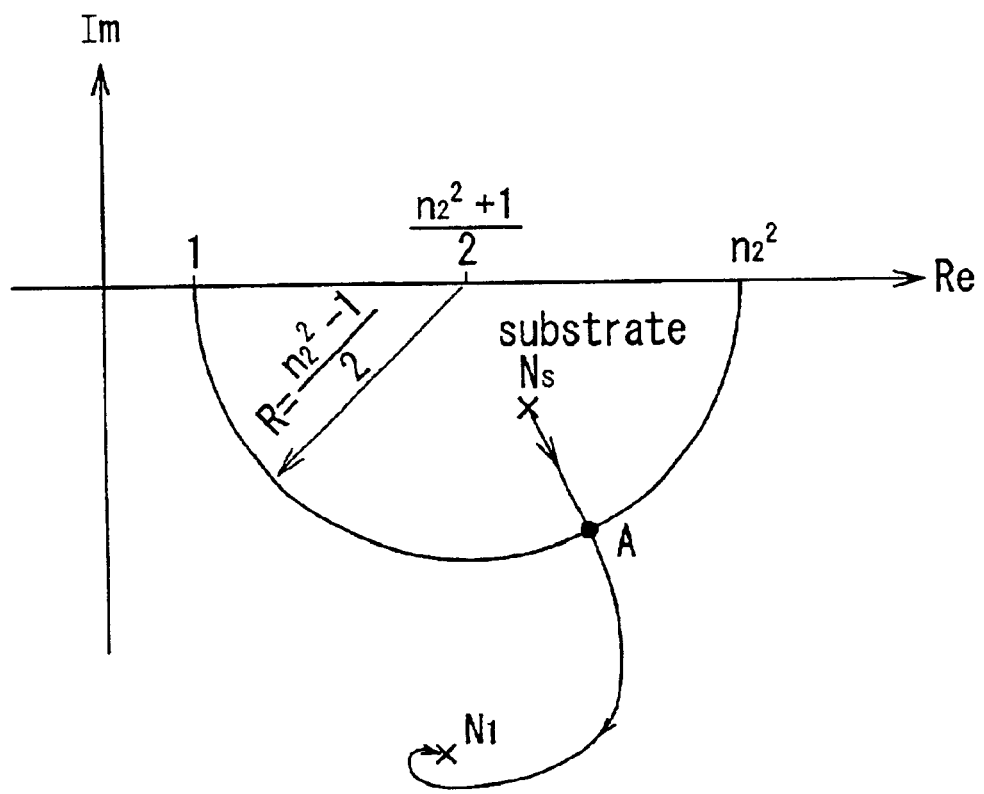
FIG. 7 is an admittance diagram in the case where the substrate and a first layer are made of a metal.

FIG. 7 is an optical admittance diagram showing the locus passing a (1, 0) point (air admittance) drawn by the second layer having the refractive index of $n_2$. The locus passes 1 and $n_2^2$ on the real axis and draws a circular arc having a center of $(n_2^2+1)/2$. In the case where the optical admittance (having a numerical value equal to the complex index N of refraction) of the material of the substrate 10 exists within the circular arc, if the optical admittance of the material of the first layer 11 exists on the outside of the circular arc, composite optical admittance of the substrate 10 and the first layer 11 starts from a point (indicated by $N_s$ in the drawing) of the optical admittance of the substrate 10 and reaches a point (indicated by $N_1$ in the drawing) of the optical admittance of the first layer 11 while drawing a gentle curve as the film thickness increases.

Since the optical admittance (equal to the complex index N of refraction) of the substrate 10 and the first layer 11 exits on both sides of the circular arc drawn by the second layer 13, it surely crosses the circular arc (point A). The thickness of the first layer 11 is determined so that the composite admittance of the substrate 10 and the first layer 11 arrives at the cross point A. From the cross point A, the composite admittance moves along the locus (circular arc) of the second layer 13.

When the second layer 13 is formed with a film thickness so that the composite admittance of the substrate 10, first layer 11, and second layer 13 is equal to one, reflection of incident light on the optical multilayer structure 1 becomes zero at a designed wavelength. When the optical admittance of the substrate 10 and the first layer 11 exists on both sides of the circular arc depending on the optical characteristic of the second layer 13, a combination of film thicknesses by which reflection becomes zero certainly exists.

In this case, the optical admittance of the substrate 10 may exist on the inside or outside of the circular arc. To satisfy such a condition, it is sufficient that the relation of optical constants of the materials of the substrate 10 and the first layer 11 satisfies the following expression (8) or the expression (1) obtained by expressing the expression (8) in another way when the complex index of refraction of the substrate 10 is $N_s$ ($=n_s-i\cdot k_s$), complex index of refraction of the first layer 11 is $N_1$ ($=n_1-i\cdot k_1$), refractive index of the second layer 13 is $n_2$, and refractive index of an incident medium is 1.0 (air).

$$1 \leq n_m \leq 5.76 \quad (8)$$

Consequently, in the case where the gap portion 12 of which size is variable is provided between the first layer 11 and the second layer 13 of the optical multilayer film constructed as described above, when the interval $d_3$ is "0", the structure serves as an antireflection film (refer to FIG. 2). When the interval $d_3$ is approximately equal to a quarter of the designed wavelength $\lambda$ ($\lambda/4$), the structure serves as a reflection film (refer to FIG. 1). That is, by varying the size of the gap portion 12 between "0" and "$\lambda/4$", the optical switching device of which reflectance can be changed between 0 and 70% or higher can be realized.

It is sufficient that the material of such an optical multilayer structure 1 satisfies the condition as described above, and the choice of options is wide. As for the configuration as well, since it is sufficient to form three layers including the gap portion 12 on the substrate, manufacture is easy. Concrete examples will be described hereinbelow.

Concrete Examples

Figure 8:
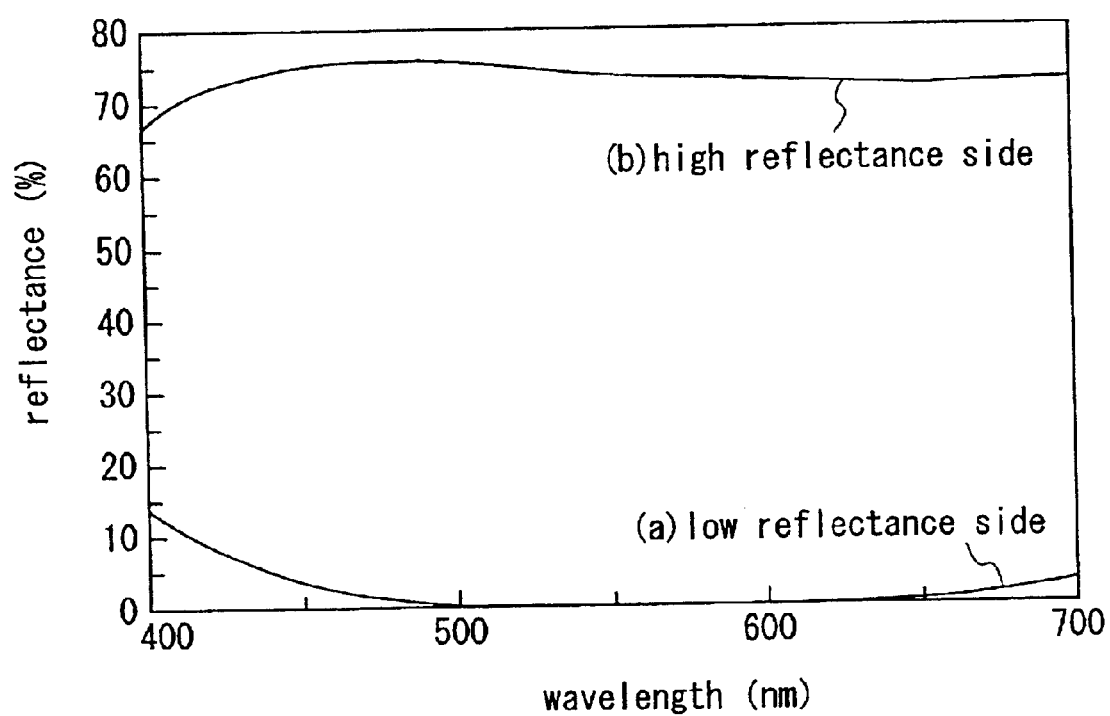
FIG. 8 is a diagram showing reflection characteristics of a concrete example of the optical multilayer structure illustrated in FIG. 1.
Figure 9:
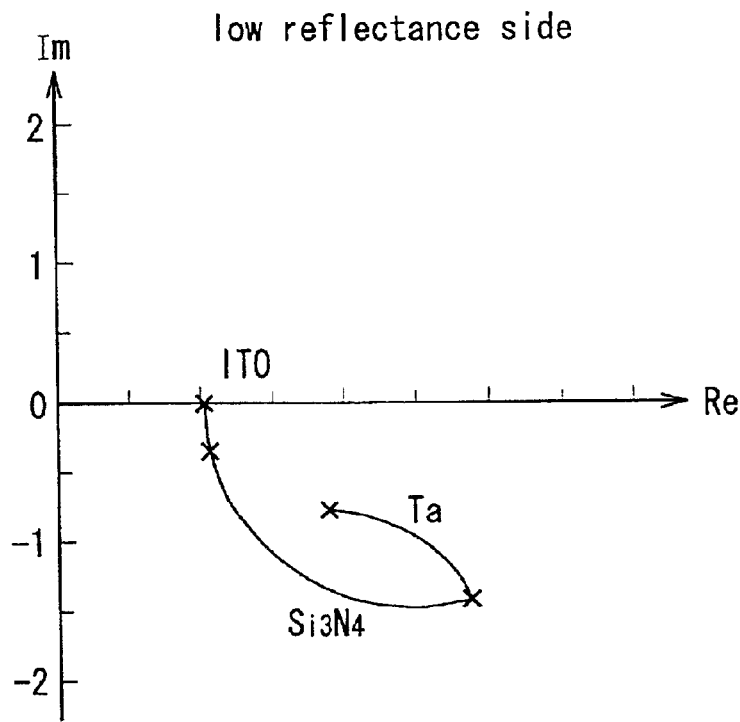
FIG. 9 is a diagram for explaining optical admittance at the time of low reflection in the example of FIG. 8.
Figure 10:
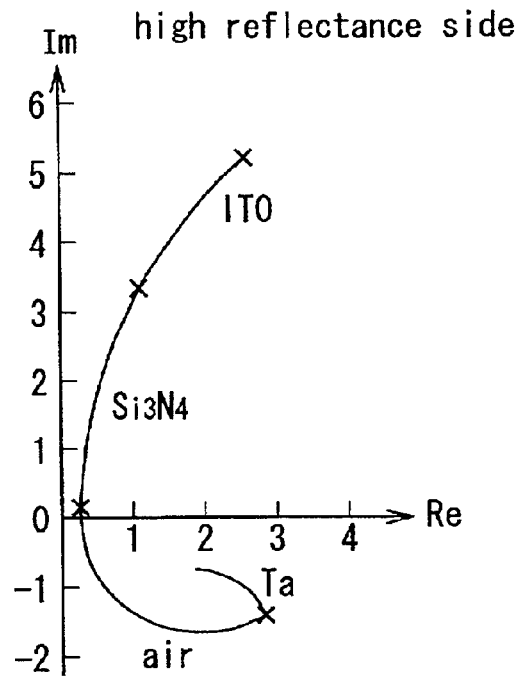
FIG. 10 is a diagram for explaining optical admittance at the time of high reflection in the example of FIG. 8.

FIG. 8 shows the relation between the wavelength (designed wavelength of 550 nm) of incident light and reflectance in the case of using an opaque carbon substrate ($N_s$=1.90, k=0.75) as the substrate, a Ta layer ($N_1$=2.46, k=1.90) as the first layer 11, an air layer (n=1.00) as the gap portion 12, and a stacked film (composite refractive index $n_2$=2.0, k=0) of an $Si_3N_4$ film and an ITO (Indium-Tin Oxide) film as the second layer 13. (a) indicates a characteristic in the case where an optical film thickness of the gap portion (air layer) is "0" (low reflectance side) and (b) indicates a characteristic in the case where the optical film thickness is "$\lambda/4$" (137.5 nm) (high reflectance side). FIGS. 9 and 10 are optical admittance diagrams shown as a reference. FIG. 9 shows the case of low reflectance. FIG. 10 shows the case of high reflectance.

As obviously understood from FIG. 8, in the optical multilayer structure 1 of the embodiment, when the optical film thickness of the gap portion (air layer) 12 is "$\lambda/4$", a high reflection characteristic is demonstrated. When the optical film thickness of the gap portion 12 is "0", a low reflection characteristic is demonstrated. Specifically, when the optical film thickness of the gap portion 12 is switched between an odd multiple of "$\lambda/4$" and an even multiple of "$\lambda/4$" (including 0", the high reflection characteristic and the low reflection characteristic are alternately displayed.

Figure 11:
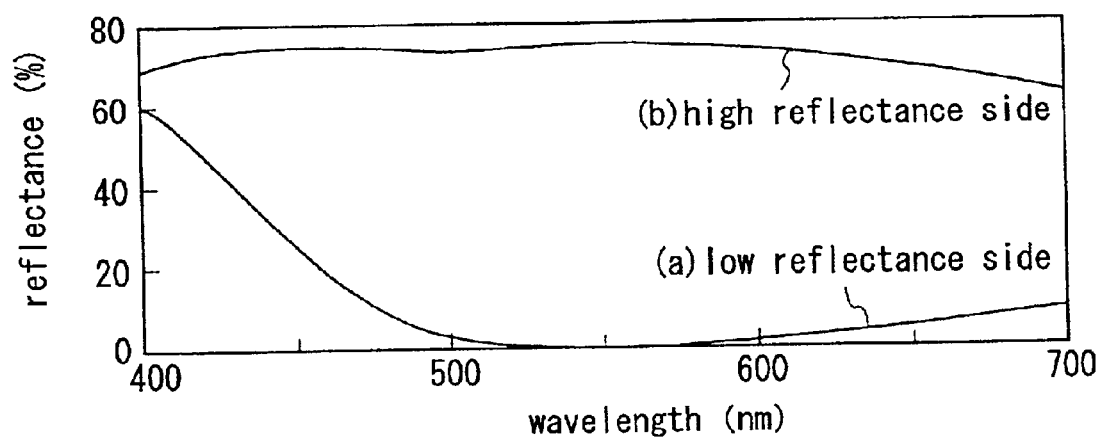
FIG. 11 is a diagram showing reflection characteristics of another concrete example of the optical multilayer structure illustrated in FIG. 1.
Figure 12:
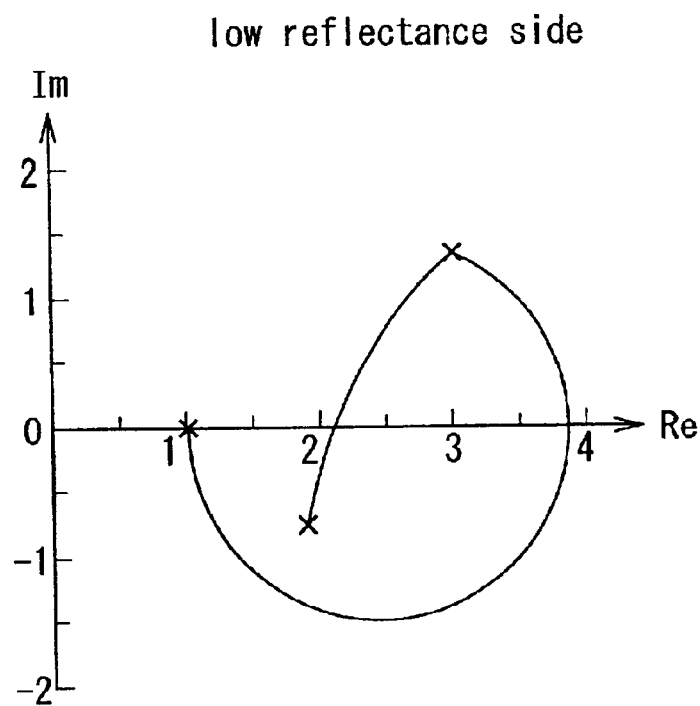
FIG. 12 is a diagram for explaining optical admittance at the time of low reflection in the example of FIG. 11.
Figure 13:
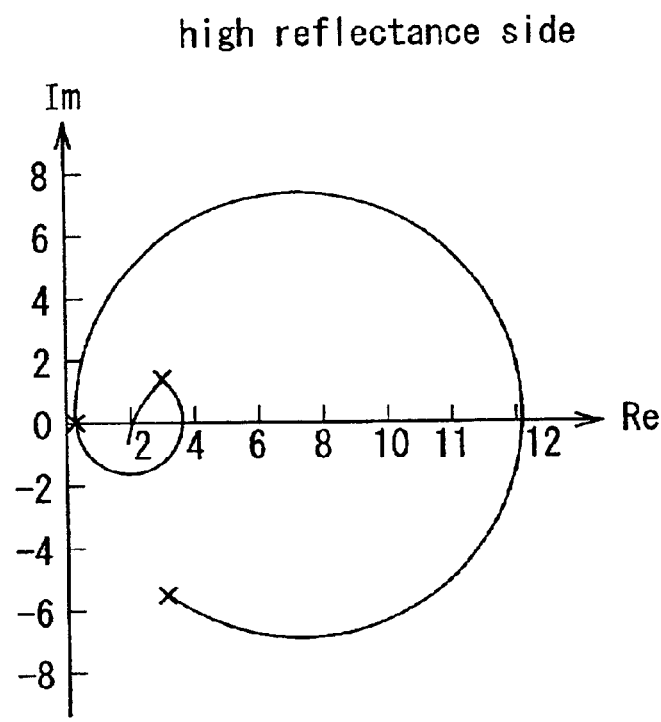
FIG. 13 is a diagram for explaining optical admittance at the time of high reflection in the example of FIG. 11.

In the case of using a metal film (such as Ta, having $k_1$=1.90) of a high extinction coefficient $k_1$ as the first layer 11, the optical film thickness of the second layer 13 becomes "$\lambda/4$". In the case of using a semiconductor material having a low $k_1$ as the first layer (for example, Si having $k_1$=0.63), the optical film thickness of the second layer 13 is larger than "$\lambda/4$" (yet smaller than $\lambda/2$). FIG. 11 shows the reflection characteristic (designed wavelength of 550 nm) in the case of forming the substrate 10 of graphite (refractive index $n_s$=1.90, k=0.75), making the first layer 11 of silicon (having refractive index $n_1$=4.40, k=0.63, and film thickness 13.09 nm), and making the second layer 13 by a stacked film (composite refractive index $n_2$=2.0, k=0, and film thickness= 83.21 nm) of an $Si_3N_4$ film and an ITO (Indium-Tin Oxide) film. (a) indicates a characteristic in the case where an optical film thickness of the gap portion (air layer) is "0" (low reflectance side) and (b) indicates a characteristic in the case where the optical film thickness is "$\lambda/4$" (137.5 nm) (high reflectance side). FIGS. 12 and 13 are optical admittance diagrams in this case. FIG. 12 shows the case of low reflectance. FIG. 13 shows the case of high reflectance.

In the two examples, it is assumed that the substrate 10 is made of opaque carbon or graphite. Carbon and graphite are suitable as the materials of the substrate 10 since the optical admittance (equal to the complex index of refraction) of each of them is positioned on the inside of the circular locus drawn so as to pass (1,0) of a transparent film having a refractive index of 2.0 on the admittance diagram for the reason that the optical admittances of many metal materials are placed on the outside of the circle.

Figure 14:
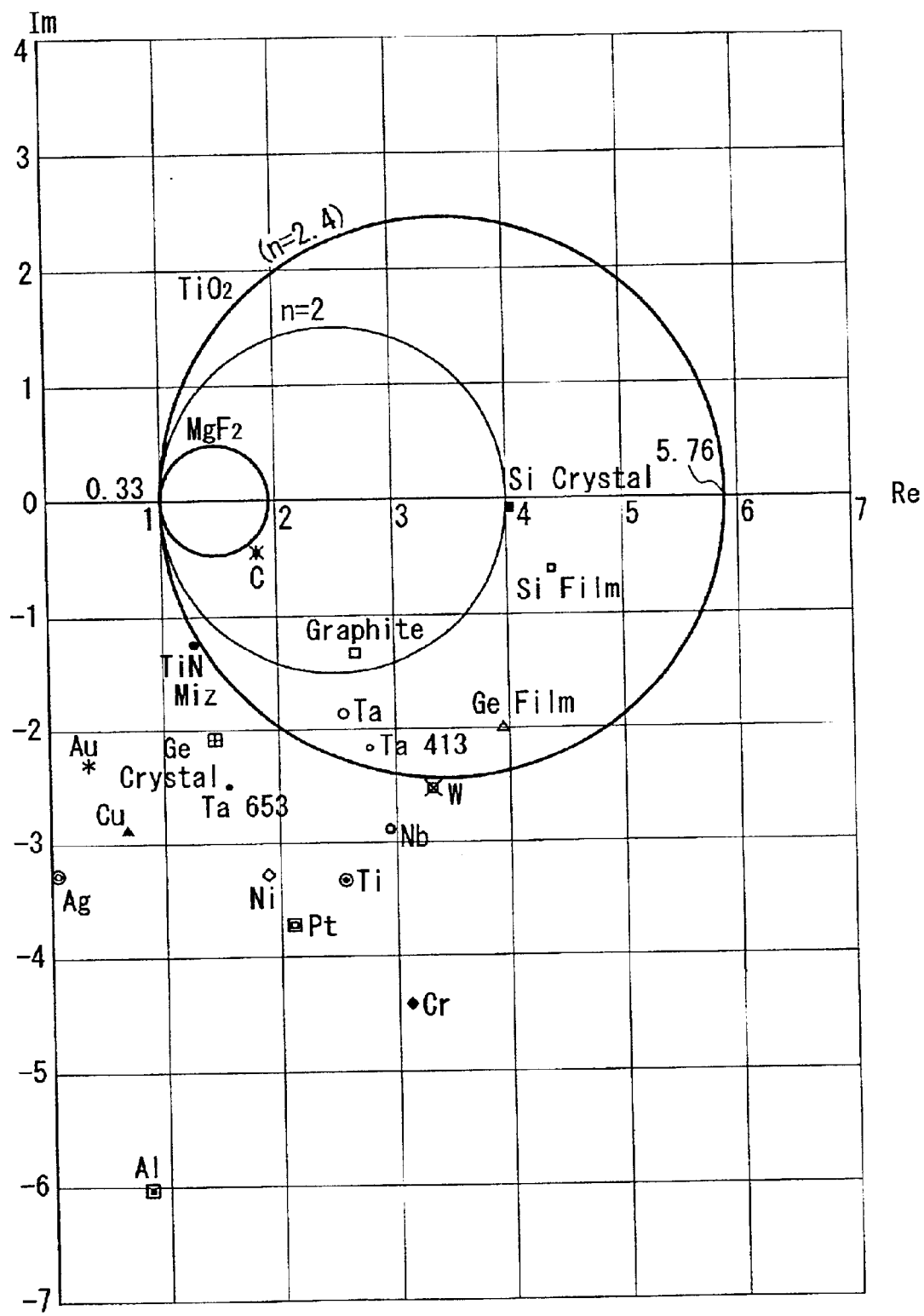
FIG. 14 is an admittance diagram obtained by plotting optical admittance of materials.

For reference, FIG. 14 is an admittance diagram obtained by plotting the optical admittances of some materials. FIG. 14 also shows loci passing a (1,0) point (air admittance) drawn by the material having the refractive index of n=2 and the $TiO_2$ (n=2.4). When the substrate 10 is made of any of the materials in the circle, the first layer 11 is made of any of the materials outside of the circle, and the second layer 13 is made of any of the materials on the circle, a combination of film thicknesses realizing low reflectance (almost zero) surely exists. For example, when the substrate 10 is made of carbon (indicated by C in the drawing), the first layer 11 is made of any of the materials outside of the circle having n=2 (most of the materials in the drawings), and the second layer 13 is made of any of the materials having n=2 (such as $Si_3N_4$, ITO, ZnO, or the like), an optical switching device having excellent characteristics can be realized.

When $TiO_2$ is used as the second layer 13, the material of the substrate 10 is selected from silicon (Si), carbon (C), tantalum (Ta), germanium (Ge) film, graphite, glass, or the like, and the material of the first layer 11 is selected from the other metals in the diagram. In such a manner, an optical switching device having excellent characteristics can be realized.

In FIG. 14, representative metal materials, semiconductor, and the like are plotted. It is also possible to plot other materials and determine whether they are on the inside or outside of the circle to thereby easily select the materials of a good combination.

It is a sufficient condition to realize the optical structure having an excellent characteristic but is not a necessary condition that the optical characteristics of the substrate 10 and the first layer 11 exist on the inside and outside of the circle of the second layer 13 as described above for the following reason. The locus of the composite optical admittance to form a light absorbing film (that is, k≠0) on the substrate 10 does not extend from the admittance of the substrate 10 toward the optical admittance of a film forming material linearly but extends toward the optical admittance of a film forming material while largely curving. Consequently, when the degree of curve is large, even if there is the optical admittance of the first layer 11 on the inside of the circle of the second layer 13, the composite optical admittance may cross the circle of the second layer 13.

Figure 15:
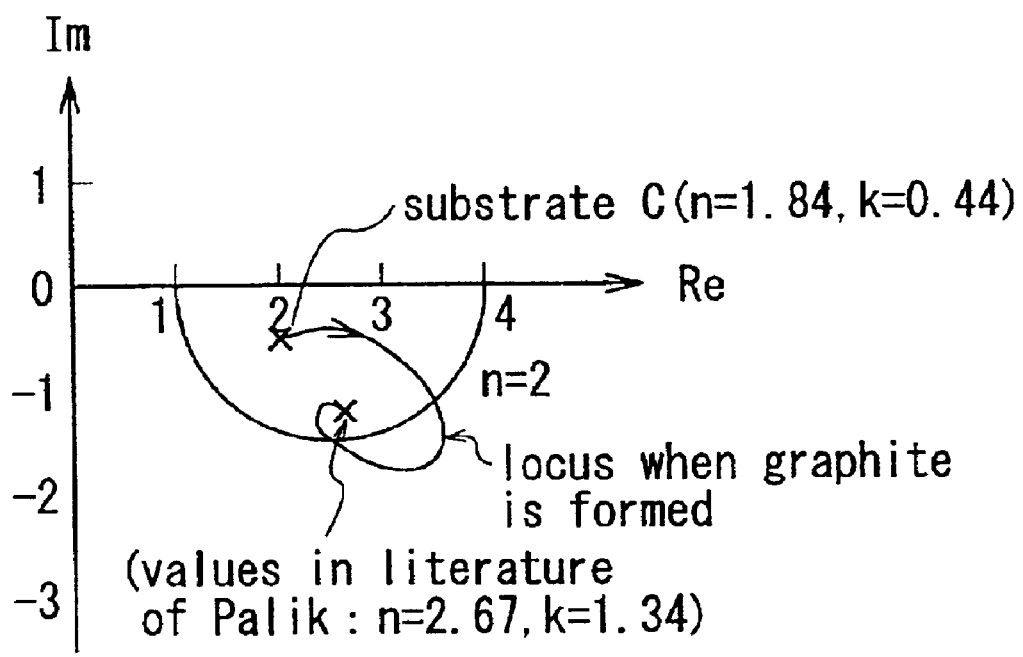
FIG. 15 is a diagram for explaining an example in which reflection can be prevented even when optical admittance of the substrate and the first layer is on the inside of that of a second layer.

FIG. 15 is a diagram showing such an example. When graphite is applied to form the first layer 11 on the substrate 10 made of carbon C, the optical admittance of the first layer 11 curves and crosses the circular arc of n=2 twice. By setting the film thickness so that the carbon C is switched to the film of n=2 (such as $Si_3N_4$, ITO, ZnO, or the like) at one of the points, an optical multilayer structure 1 having an excellent characteristic can be realized.

In the embodiment, in a visible light region of, for example, 550 nm, the low reflectance can be set to almost zero and the high reflectance can be set to 70% or higher. Consequently, modulation of high contrast can be performed. Moreover, since the configuration is simple, the structure can be fabricated more easily as compared with a grating diffraction structure such as GLV and a complicated three-dimensional structure such as a DMD. Although six lattice-state ribbons are necessary for one pixel in the GLV, one ribbon is sufficient per pixel in the optical multiplayer structure 1 of the embodiment. Thus, the configuration is simple and a small structure can be fabricated. Since a movable portion moving range is at most "λ/2", high response at the level of 10 ns can be realized. In the case of using the structure as a light valve for a display, the structure can be realized by a simple configuration of a one-dimensional array as will be described.

Further, since the optical multilayer structure 1 of the embodiment is essentially different from a narrow-bandpass filter having a structure in which a gap portion is sandwiched by a metal thin film and a reflection layer, that is, a Fabry-Perot type filter, the bandwidth of a low reflection band can be made wide. Therefore, a relatively wide margin for managing the film thickness at the time of manufacture can be obtained, so that design flexibility is increased.

In the embodiment, the refractive index of each of the substrate 10 and the first layer 11 may be an arbitrary value in a certain range, so that the choice of options in selecting materials is widened. When the substrate 10 is made of an opaque material, incident light is absorbed by the substrate 10 at the time of low reflectance, and there is consequently no fear that stray light or the like is generated.

By using the optical multilayer structure 1 of the embodiment as described above, a high speed, small optical switching device and an image display can be realized. The details will be described hereinlater.

Figure 16:
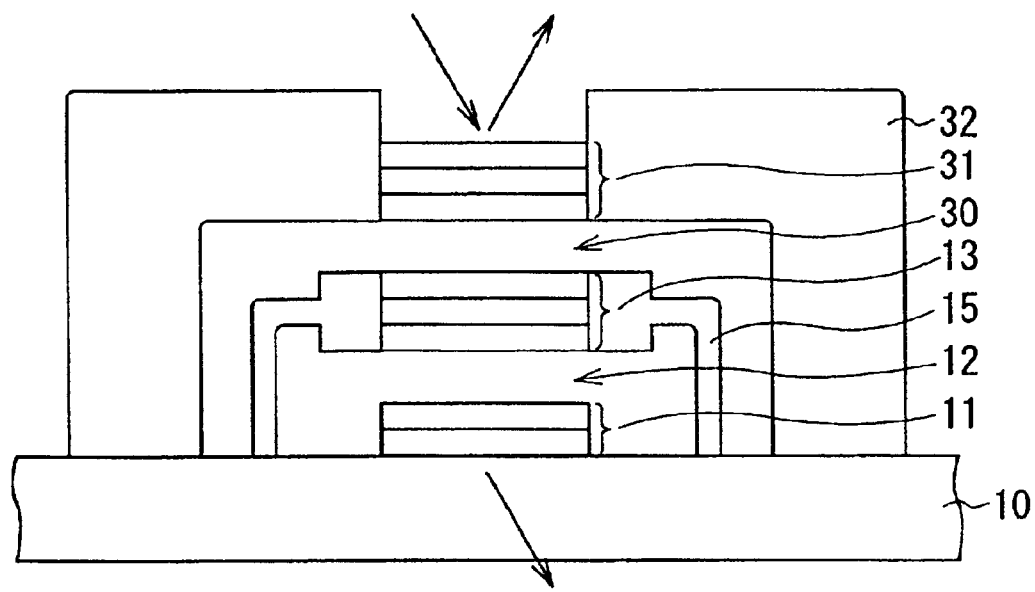
FIG. 16 is a cross section for explaining further another modification of the first embodiment.

Although the gap portion in the optical multilayer structure 1 is a single layer in the foregoing embodiment, it can consists of a plurality of layers, for example, two layers as shown in FIG. 16. In a structure of FIG. 16, the first layer 11, first gap portion 12, second layer 13, a second gap portion 30, and a third transparent layer 31 are sequentially stacked on the substrate 10, and the second layer 13 and the third transparent layer 31 are supported by, for example, supporting members 15 and 32 made of silicon nitride, respectively.

In the optical multilayer structure, the second layer 13 as an intermediate layer is displaced in the vertical direction, one of the first and second gap portions 12 and 30 is accordingly narrowed, and the other gap portion is widened, thereby changing the reflection characteristic.

Driving Method

Concrete means for changing the size of the gap portion 12 in the optical multilayer structure 1 will now be described.

Figure 17:
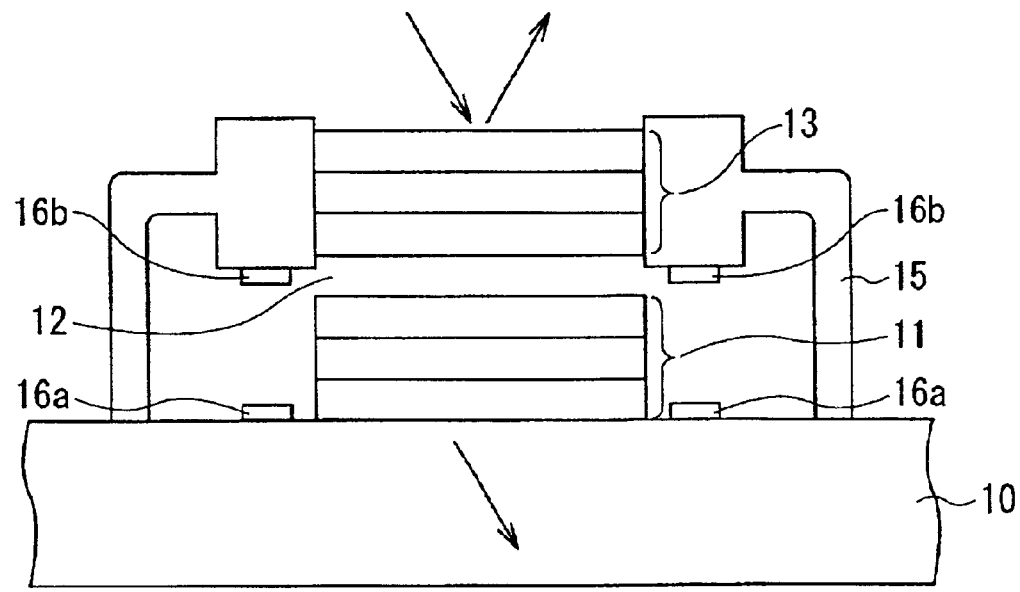
FIG. 17 is a cross section for explaining a driving method by static electricity of an optical multilayer structure.

FIG. 17 shows an example of driving an optical multilayer structure by an electrostatic force. In the optical multilayer structure, electrodes 16a and 16a made of aluminum or the like are provided on the first layer 11 on the transparent substrate 10, the second layer 13 is supported by the supporting member 15 made of silicon nitride ($Si_3N_4$), and electrodes 16b, 16b are formed in positions facing the electrodes 16a, 16a of the supporting member 15.

In the optical multilayer structure, by an electrostatic force generated by a potential difference which occurs when a voltage is applied to the electrodes 16a and 16a and the electrodes 16b and 16b, the optical film thickness of the gap portion 12 is switched in binary, for example, between "λ/4" and "0" or between "λ/4" and "λ/2". Obviously, by continuously changing a voltage applied to the electrodes 16a and 16a and the electrodes 16b and 16b, the size of the gap portion 12 can be continuously changed in a range of certain values, and an amount of reflection, transmission, absorption, or the like of incident light is changed continuously (in an analog manner).

Figure 18:
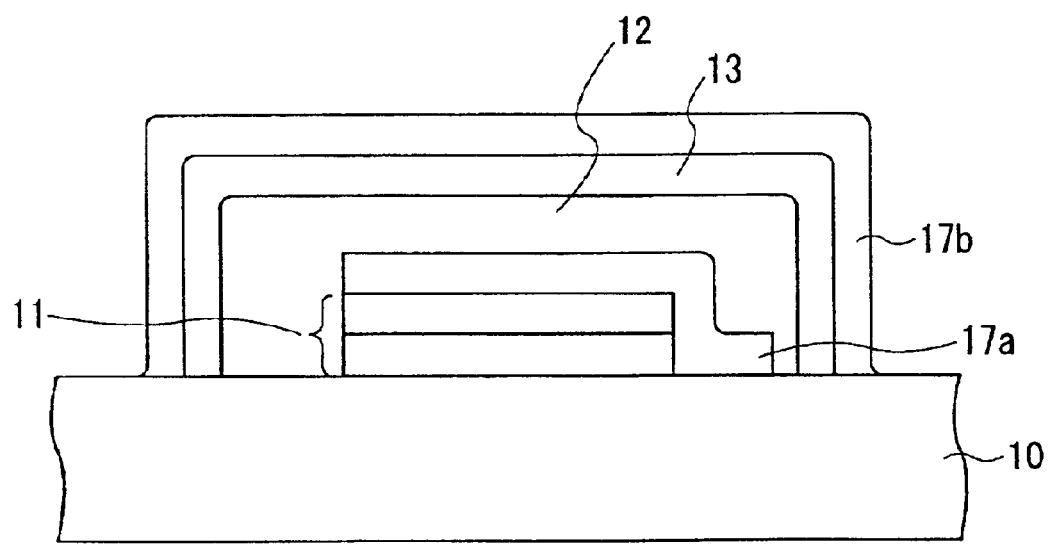
FIG. 18 is a cross section for explaining another driving method by static electricity of the optical multilayer structure.
Figure 19:
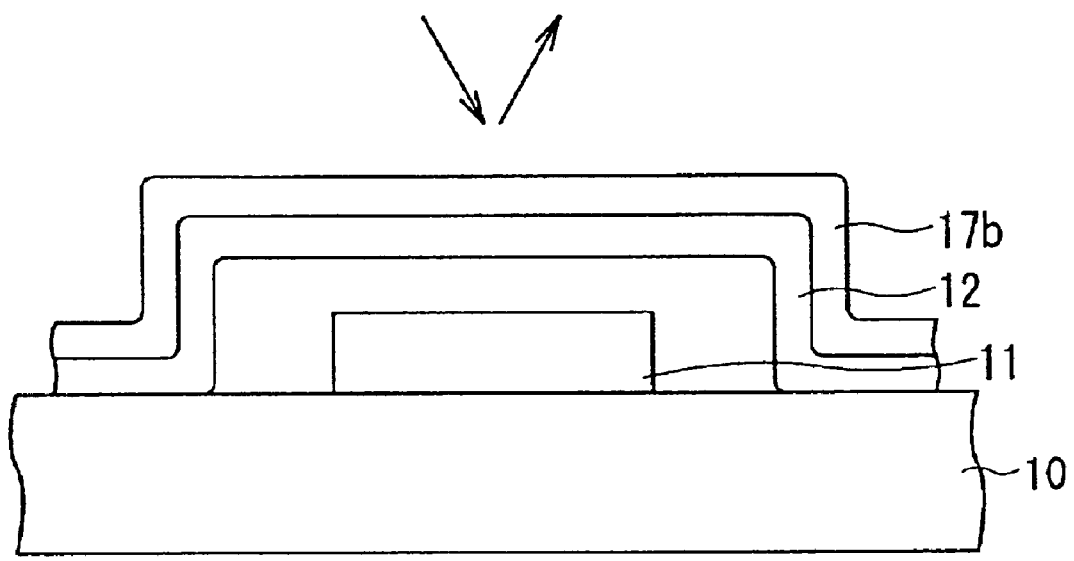
FIG. 19 is a cross section for explaining further another driving method by static electricity of the optical multilayer structure.

The optical multilayer structure can be driven by an electrostatic force by other methods shown in FIGS. 18 and 19. In the optical multilayer structure 1 shown in FIG. 1, a transparent conductive film 17a made of, for example, ITO (Indium-Tin Oxide) is provided on the first layer 11 on the transparent substrate 10, a second layer 13 made of, for example, $SiO_2$ is formed in a bridge structure, and a transparent conductive film 17b made of ITO is provided on the outer face of the second layer 13.

In the optical multilayer structure, the optical film thickness of the gap portion 12 can be switched by an electrostatic force generated by a potential difference which occurs when a voltage is applied across the transparent conductive films 17a and 17b.

In the optical multilayer structure shown in FIG. 19, in place of the transparent conductive film 17a in the optical multilayer structure of FIG. 18, for example, a tantalum (Ta) film is provided as the first layer 11 having conductivity.

Figure 20A:
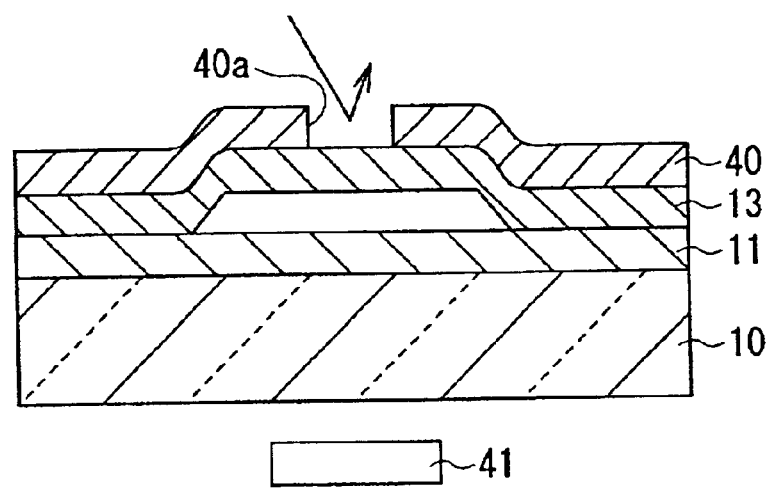
FIGS. 20A and 20B are cross sections for explaining a driving method by magnetic of the optical multilayer structure.
Figure 20B:
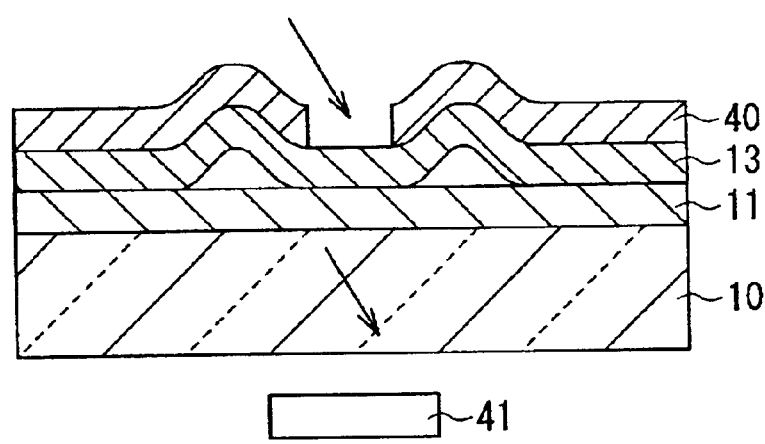

To drive the optical multilayer structure, other than the electrostatic force, various methods such as a method of using a micromachine such as a toggle mechanism or piezoelectric device, a method of using a magnetic force, and a method of using a shape memory alloy. FIGS. 20A and 20B show modes of driving an optical multilayer structure by using a magnetic force. In this optical multilayer structure, a magnetic layer 40 made of a magnetic material such as cobalt (Co) having an opening is provided on the second layer 13, and an electromagnetic coil 41 is provided below the substrate 10. By switching the turn-off and turn-on of the electromagnetic coil 41, the size of the gap portion 12 is switched between, for example, "$\lambda/4$" (FIG. 20A) and "0" (FIG. 20B), thereby changing the reflectance.

Optical Switching Apparatus

Figure 21:
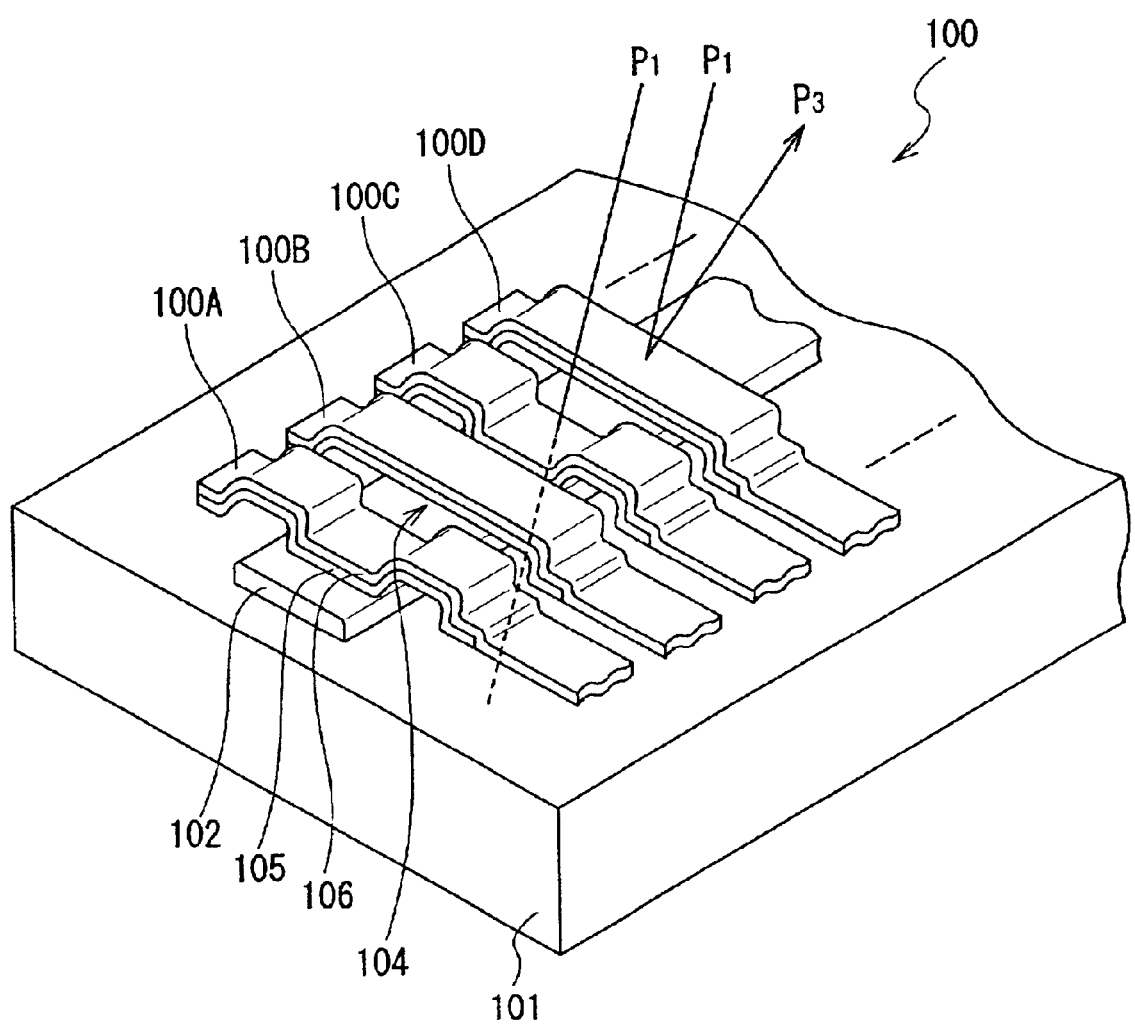
FIG. 21 is a diagram showing the configuration of an example of an optical switching device.

FIG. 21 shows the configuration of an optical switching device 100 using the optical multilayer structure 1. The optical switching device 100 is obtained by arranging a plurality of (four in the diagram) optical switching devices 100A to 100D on a substrate 101 made of carbon or the like in a one-dimensional array. The optical switching devices 100A to 100D may be also arranged two-dimensionally. In the optical switching device 100, along one direction (device arrangement direction) of the surface of the substrate 101, for example, a Ta film 102 is formed.

On the substrate 101, a plurality of $Si_3N_4$ films 105 are disposed in a direction orthogonal to the Ta film 102. On the outside of the $Si_3N_4$ film 105, an ITO film 106 as a transparent conductive film is formed. The ITO film 106 and the $Si_3N_4$ film 105 correspond to the second layer 13 in the embodiment and form a bridge structure in a position over the Ta film 102. Between the Ta film 102 and the ITO film 106, a gap portion 104 of which size changes according to a switching (on/off) operation. An optical film thick of the gap portion 104 changes between, for example, "$\lambda/4$" (137.5 nm) and "0" at a wavelength ($\lambda$=550 nm) of incident light.

The optical switching devices 100A to 100D switch the optical film thickness of the gap portion 104 between, for example, "$\lambda/4$" and "0" by an electrostatic force generated by a potential difference caused by a voltage applied to the Ta film 102 and the ITO film 106. FIG. 21 shows a state where gap portion 104 in each of the optical switching devices 100A and 100C is "0" (that is, low reflectance state) and a state where the gap portion 104 in each of the optical switching devices 100B and 100D is "$\lambda/4$" (that is, high reflectance state). By the Ta film 102, the ITO film 106, and a voltage applying device (not shown), "driving means" of the invention is constructed.

In the optical switching device 100, when the Ta film 102 is grounded to set the potential at 0V, and +12V is applied to the ITO film 106 formed on the second layer side, by the potential difference, an electrostatic force is generated between the Ta film 102 and the ITO film 106. In FIG. 21, like the optical switching devices 100A and 100C, the first and second layers are closely attached to each other and the gap portion 104 is in the "0" state. In this state, incident light $P_1$ passes through the multilayer structure and is absorbed by the substrate 21.

When the transparent conductive film 106 on the second layer side is grounded to set the potential at 0V, there is no electrostatic force between the Ta film 102 and the ITO film 106. In FIG. 21, like the optical switching devices 100B and 100D, the first and second layers are apart from each other and the gap portion 12 enters the "$\lambda/4$" state. In this state, the incident light $P_1$ is reflected as reflection light $P_3$.

In such a manner, according to the embodiment, in each of the optical switching devices 100A to 100D, the gap portion is switched in binary by an electrostatic force, thereby switching the incident light $P_1$ between the state where there is no reflection light and the state where the reflection light $P_3$ is generated in binary. Obviously, by continuously changing the size of the gap portion as described above, the incident light $P_1$ can be continuously changed between the state where there is not reflection light to the state where the reflection light $P_3$ is generated.

In each of the optical switching devices 100A to 100D, the distance of movement of the movable portion is at most about "$\lambda/2$ (or $\lambda/4$)" of incident light. Consequently, response is about 10 ns and sufficiently high. Thus, a light valve for display can be realized by a one-dimensional array structure.

In addition, in the embodiment, by assigning a plurality of optical switching devices to a pixel, each of the optical switching devices can be driven independently. Therefore, in an image display, the gradation display of an image can be realized not only by a method of time division but also a method of area division.

Image Display

Figure 22:
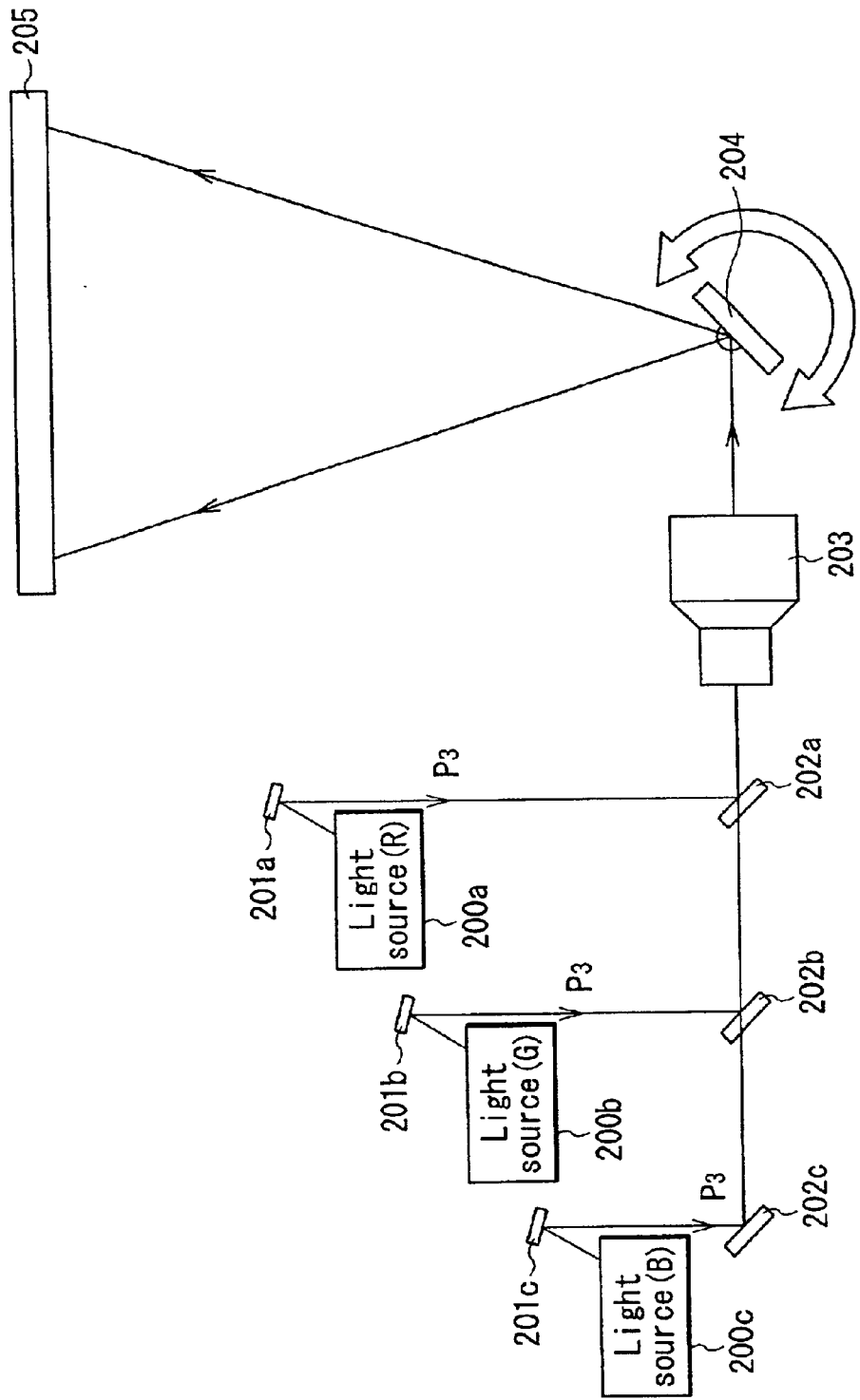
FIG. 22 is a diagram showing the configuration of an example of a display.

FIG. 22 shows the configuration of a projection display as an image display using the optical switching device 100. An example of using reflection light $P_3$ from the optical switching devices 100A to 100D will be described here.

The projection display includes light source 200a, 200b, and 200c taking the forms of lasers of red (R), green (G), and blue (B), optical switching device arrays 201a, 201b, and 201c provided in correspondence with the light sources, dichroic mirrors 202a, 202b, and 202c, a projection lens 203, a galvanometer mirror 204 as an uniaxial scanner, and a projection screen 205. The three primary colors are not limited to red, green, and blue but may be cyan, magenta, and yellow. Each of the switching device arrays 201a, 201b, and 201c is obtained by one-dimensionally arranging a plurality of necessary pixels, for example, 1000 pixels in a direction perpendicular to the drawing sheet, and functions as a light valve.

In the projection display, light emitted from the light sources 200a, 200b, and 200c of R, G, and B is incident on the light switching device arrays 201a, 201b, and 201c. Preferably, the incident angle is set to be zero so that light is incident perpendicularly. The reflection light $P_3$ from the optical switching devices is condensed to the projection lens 203 by the dichroic mirrors 202a, 202b, and 202c. The light condensed by the projection lens 203 is scanned by the galvanometer mirror 204 and is projected as a two-dimensional image on the projection screen 205.

In the projection display as described above, a plurality of optical switching devices are arranged one-dimensionally, irradiated with light of RGB, and switched light is scanned by the uniaxial scanner, thereby enabling a two-dimensional image to be displayed.

In the embodiment, the reflectance in a low reflection mode can be set to 0.1% or lower, and that in a high reflection mode can be set to 70% or higher. Consequently, an image can be displayed at a high constant of about 1000 to 1, and a characteristic at a position light is incident on an device perpendicularly can be demonstrated, so that it is unnecessary to consider polarization of light and the like at the time of assembling an optical system, and the configuration is simple.

Figure 23:
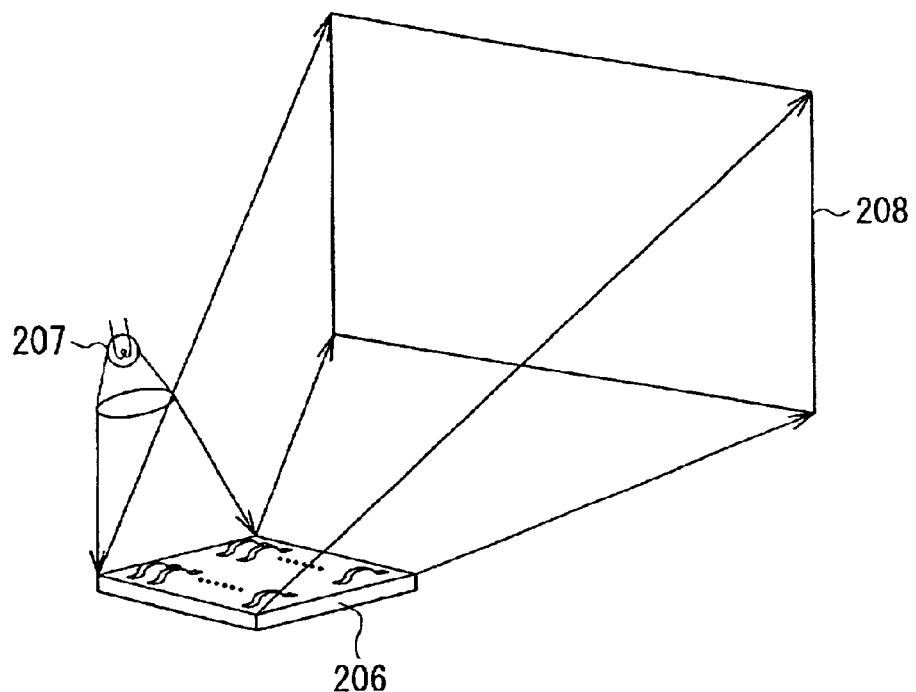
FIG. 23 is a diagram showing another example of the display.

The invention has been described by the foregoing embodiments but is not limited to the foregoing embodiments and modifications and can be variously modified. For example, in the embodiment, the display of the configuration of scanning the light valves in a one-dimensional array by using a laser as a light source has been described. As shown in FIG. 23, a configuration of displaying an image on the projection screen 208 by emitting light from a white light source 207 to an optical switching device 206 in which devices are arranged two-dimensionally can be also employed.

Figure 24:
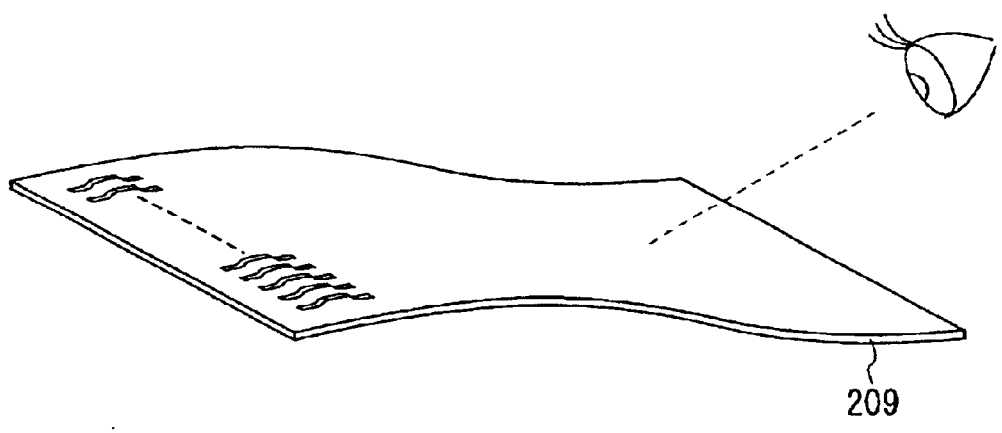
FIG. 24 is a diagram showing the configuration of a paper-state display.

In the foregoing embodiment, the example of using the glass substrate as a substrate has been described. Alternately, as shown in FIG. 24, a direct-view-type, paper-state display using a flexible substrate 209 having a thickness of, for example, 2 mm or less may be used.

Further, in the embodiment, the example of using the optical multilayer structure of the invention for the display has been described. It is also possible to apply the optical multilayer structure of the invention to various devices other than the display, such as an optical printer. For example, the optical multilayer structure is used for an optical printer to form an image onto a photosensitive drum.

Second Embodiment

Figure 25:
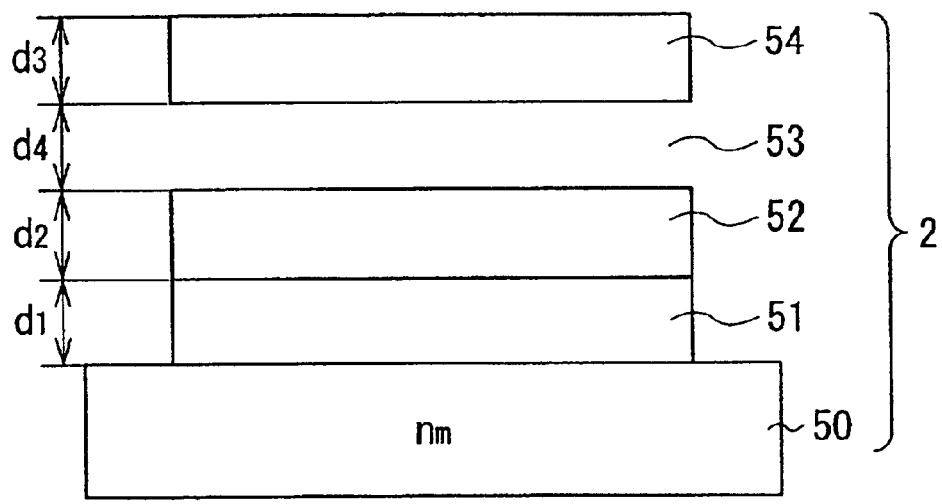
FIG. 25 is a cross section showing the configuration when a gap layer in an optical multilayer structure according to a second embodiment is "λ/4".
Figure 26:
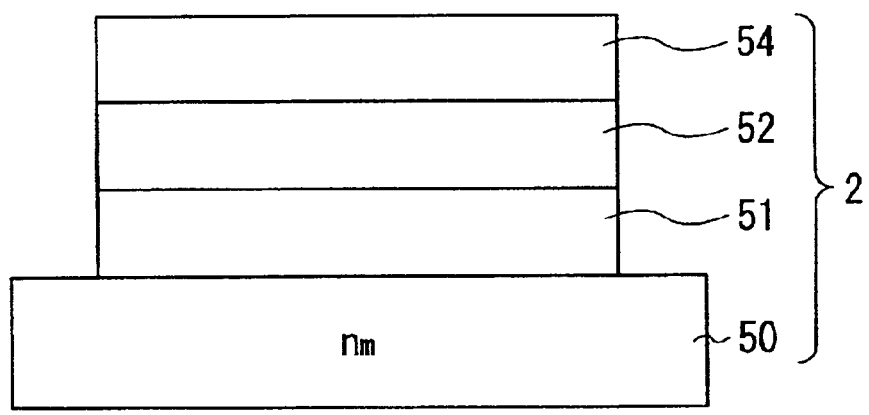
FIG. 26 is a cross section showing the configuration when the gap layer in the optical multilayer structure in FIG. 25 is "0".

Each of FIGS. 25 and 26 shows a basic configuration of an optical multilayer structure 2 according to a second embodiment of the invention. FIG. 25 shows a state where a gap portion 53 which will be described hereinlater exists in the optical multilayer structure 2, and FIG. 26 shows a state where there is no gap portion in the optical multilayer structure 2.

The optical multilayer structure 2 is constructed by stacking, on a substrate 50 made of, for example, a metal, a first transparent layer 51 made of a material having a high refractive index, a second transparent layer 52 made of a material having a low refractive index, a gap portion 53 having a changeable size capable of causing an optical interference phenomenon, and a third transparent layer 54 made of a material having a high refractive index.

The position of the gap portion 53 is not limited to the example (the position between the second and third transparent layers 52 and 54) but the gap portion 53 may be provided between the substrate 50 and the first transparent layer 51 or between the first and second transparent layers 51 and 52. The reflection characteristic on a high reflectance side varies according to the position of the gap portion.

In the embodiment, a refractive index $n_m$ of the substrate 50 and an extinction coefficient $k_m$ satisfy the relations of the following expressions (9) and (10) but do not satisfy the relations of the following expressions (11) and (12).

$$0.33 \leq n_m \leq 17.45 \qquad (9)$$

$$k_m \leq \sqrt{73.27-(n_m-8.89)^2} \qquad (10)$$

$$1 \leq n_m \leq 5.76 \qquad (11)$$

$$k_m \leq \sqrt{5.66-(n_m-3.38)^2} \qquad (12)$$

As specific materials of the substrate 50, metals such as chromium (Cr) and titanium (Ti) can be mentioned. Other than those materials, a metal nitride such as titanium nitride ($TiN_x$), a semiconductor such as germanium (Ge), or an opaque oxide such as chromium oxide (CrO) may be used.

The "material having a high refractive index" of the first and third transparent layers 51 and 54 has a refractive index n of 2.0 or higher. For example, $TiO_2$ (n=2.4), $Nb_2O_5$ (n=2.1), and $Ta_2O_5$ (n=2.1) can be mentioned. On the other hand, the "material having a low refractive index" of the second transparent layer 52 has a refractive index n lower than 2.0. For example, $MgF_2$ (n=1.38), $SiO_2$ (n=1.46), and $Al_2O_3$ (n=1.67) can be mentioned. The second transparent layer 52 having a low refractive index may be an air layer (n=1.0) or the like similar to the gap portion 53 which will be described hereinlater. In this case, the size $d_2$ of the second transparent layer (air layer) is fixed.

Although the lowest layer is the substrate 50 in this example, it may be replaced by a layer or portion such as a Cr film of, for example, 100 nm which absorbs incident light so that transmission light becomes substantially zero.

Each of the optical film thicknesses $d_1$ and $d_2$ of the first and second transparent layers 51 and 52 is equal to or smaller than "$\lambda/2$" ($\lambda$ denotes a design wavelength of incident). The optical film thickness $d_3$ of the third transparent layer 54 is "$\lambda/4$". The film thicknesses $d_1$ and $d_2$ are not strictly equal to "$\lambda/2$" and "$\lambda/4$", respectively, but may be approximately equal to the values for the following reason. For example, when the film thickness $d_1$ of the first transparent layer 51 becomes thicker than $\lambda/2$, it can be compensated by, for example, reducing the thickness of the second transparent layer 52. A slight deviation from an ideal refractive index in the expressions (8) to (11) may be compensated by adjusting the film thickness. In the specification, the expressions "$\lambda/2$" and "$\lambda/4$" include values "approximately $\lambda/2$" and "approximately $\lambda/2$" and "approximately $\lambda/4$".

Each of the second and third transparent layers 52 and 54 may take the form of a composite layer constructed by two or more layers having optical characteristics different from each other. In this case, the optical characteristics (optical admittance) of the composite layer have to be equivalent to those in the case of a single layer.

The gap portion 53 is set to that its optical size (the interval between the second and third layers 52 and 53) can be varied by driving means described hereinlater. A medium filling the gap portion 53 may be gas or liquid as long as it is transparent. Examples of the gas are air (having a refractive index $n_D$=1.0 with respect to sodium D ray (589.3 nm)), nitrogen ($N_2$) ($n_D$=1.0) and the like. Examples of the liquid are water ($n_D$=1.333) silicone oil ($n_D$=1.4 to 1.7), ethyl alcohol ($n_D$=1.3618), glycerin ($n_D$=1.4730), diiodomethane ($n_D$=1.737), and the like. The gap portion 12 may be in a vacuum state.

The optical size $d_4$ of the gap portion 53 changes in a binary manner or continuously between "an odd multiple of $\lambda/4$" and "an even multiple of $\lambda/4$ (including 0)". Accordingly, the amount of reflection, transmission, or absorption of incident light changes in a binary manner or continuously. Like the case of the thickness of the third transparent layer 54 in FIG. 13, consequently, the expression of "$\lambda/4$" includes "approximately $\lambda/4$".

In the optical multilayer structure 2 of the embodiment, by changing the optical size of the gap portion 53, an amount of reflection of light incident on the side opposite to the substrate 50. Concretely, the optical size of the gap layer 53 is changed between an odd multiple of $\lambda/4$ and an even multiple of $\lambda/4$ (including 0) (for example, between "80 /4" and "0") in a binary manner or continuously, an amount of reflection, transmission, or absorption of incident light is changed.

By referring to FIGS. 5A and 5B, 6A and 6B, and FIG. 27, the meaning of Equations (8) to (11) will be described.

In the optical multilayer structure of the first embodiment, as described by using FIGS. 5A and 5B, and 6A and 6B, when the optical film thickness of the air layer as the gap portion 53 is changed from "0" to "$\lambda/4$", the reflectance changes from "0%" to "76%" in the case where the substrate is made of a non-metallic metal material such as a glass, that is when k=0 in the complex index N of refraction=n-i·k.

Figure 27:
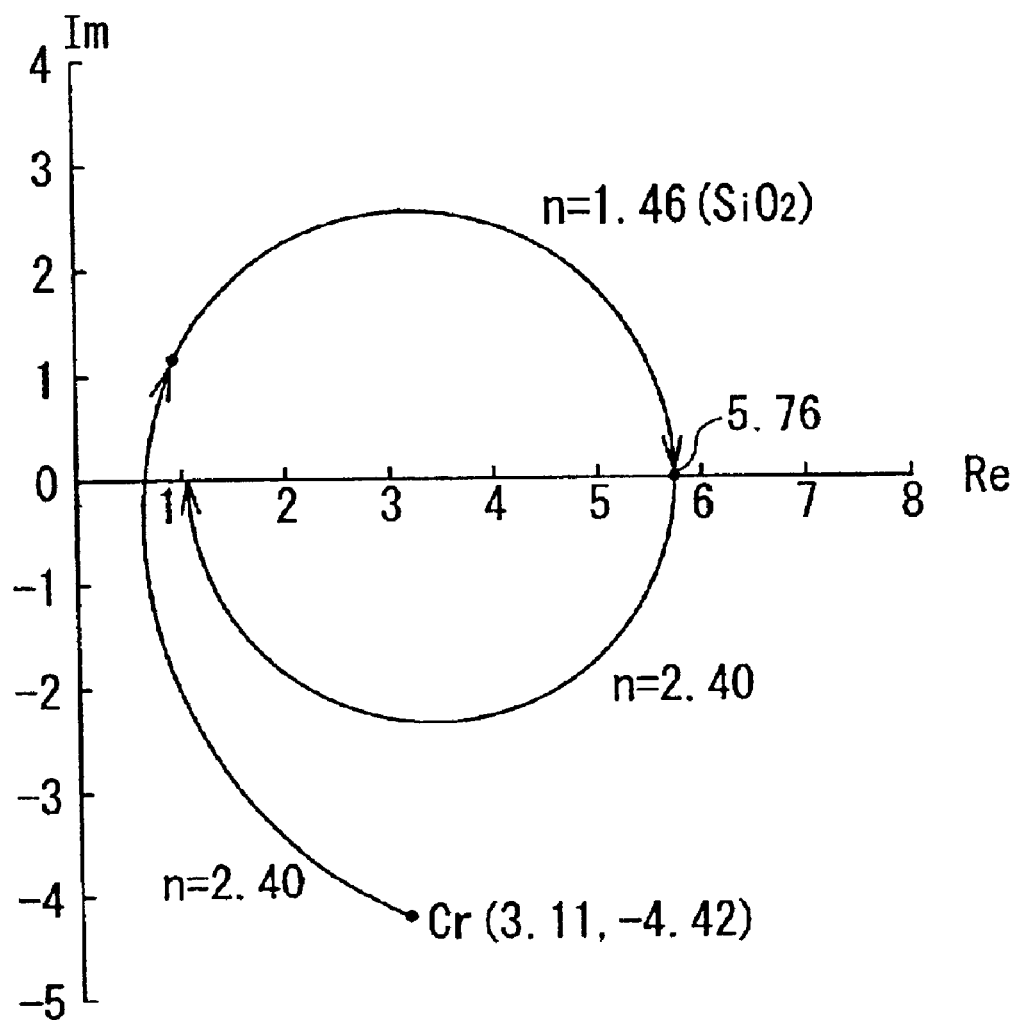
FIG. 27 is an admittance diagram in the case where the substrate is made of a metal.

In contrast, when the substrate is made of an opaque metal material, k is not equal to zero. Consequently, the start point of a locus on an admittance diagram is (n, −k) on the diagram. When the substrate is made of, for example, chromium (Cr), as shown in FIG. 27, n is equal to 3.11 and k is equal to 4.42 at an incident wavelength $\mu$ of 550 nm. Like the foregoing example, in order to obtain an antireflection characteristic, a high refractive index layer (first transparent layer 11) such as $TiO_2$ (n=2.40) is formed at the point (3.11, −4.42) of Cr and a low refractive layer (second transparent layer 12) made of $SiO_2$ (n=1.46) or the like is formed on the first transparent layer 51. A composite admittance is consequently realized at a point (0, 5.76) on a real axis Re. When a high refractive index layer (third transparent layer 54) made of $TiO_2$ (n=2.4) or the like is formed with a film thickness of $\lambda/4$ on the second transparent layer 52, the locus of the composite admittance returns to the point (0, 1) on the real axis, so that no reflection occurs. That is, as shown in FIG. 26, in a state where the gap portion 53 in the optical multilayer structure 2 is "0", incident light is absorbed and no reflection light is generated.

Third Embodiment

In the embodiment, on the substrate 50, the first transparent layer 51 made of a material having a high refractive index, the second transparent layer 52 made of a material having a low refractive index, and the third transparent layer 54 made of a material having a high refractive index are sequentially stacked in this order. When the substrate 50 is made of an opaque metal material, according to the start point of the complex index of refraction, that is, admittance, as shown in FIG. 28 or 29, a first transparent layer 51A made of a material having a low refractive index and a second transparent layer 52A made of a material having a high refractive index are stacked on the substrate 50 in this order.

Figure 28:
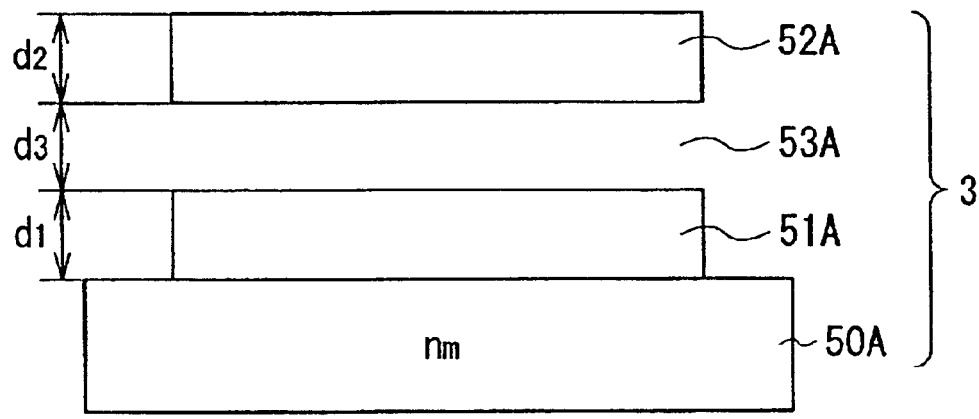
FIG. 28 is a cross section showing the configuration of an optical multilayer structure according to a third embodiment.

In the optical multilayer structure 3 shown in FIG. 28, a gap portion 53A taking the form of, for example, an air layer is provided between the first transparent layer 51A made of the material having a low refractive index and the second transparent layer 52A made of the material having a high refractive index. In contrast, in the optical multilayer structure 4 shown in FIG. 29, the gap portion 53A taking the form of, for example, an air layer is provided between the substrate 50 and the first transparent layer 51A made of the material having a low refractive index. The first transparent layer 51A having a low refractive index may take the form of the same air layer (n=1.0) as the gap portion 53A. However, different from the gap portion 53A, the size of this air layer is fixed.

Figure 29:
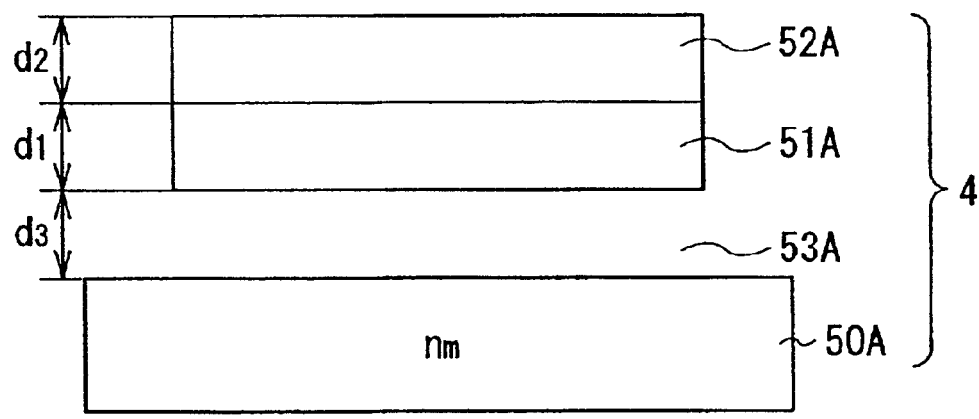
FIG. 29 is a cross section for explaining a modification of the third embodiment.
Figure 30:
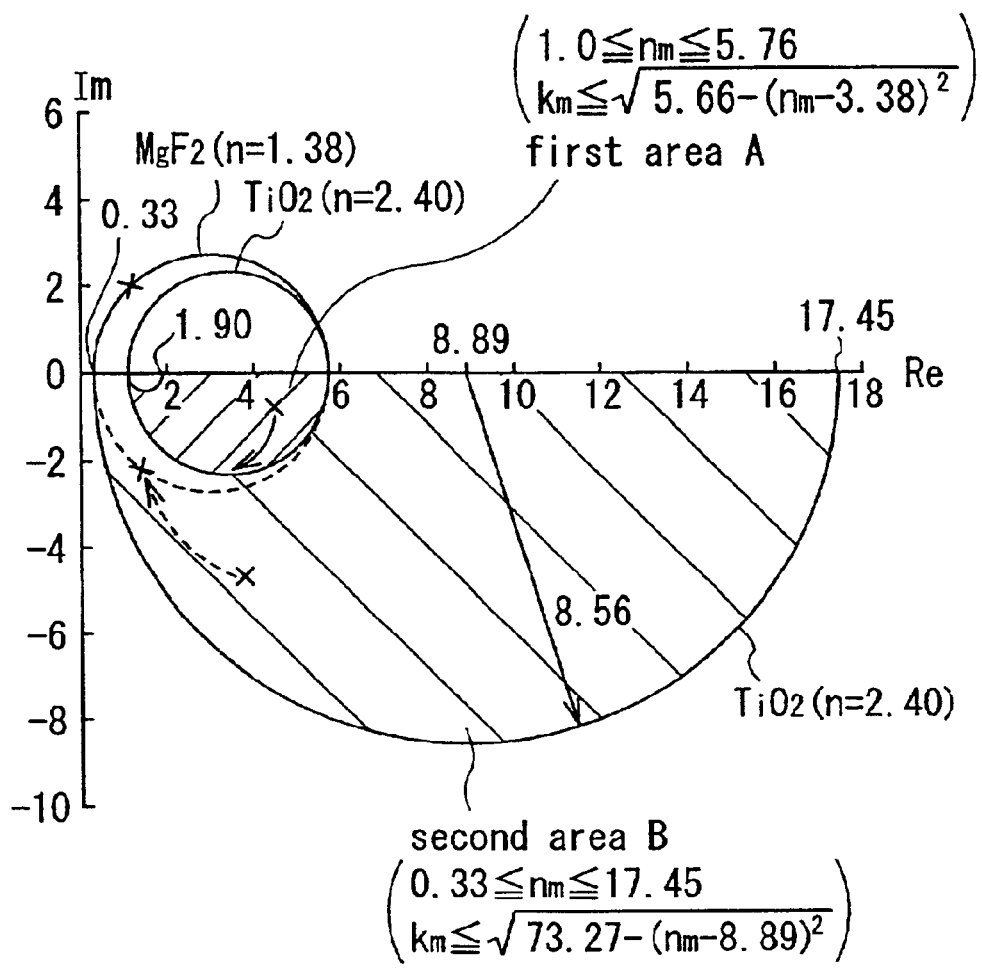
FIG. 30 is an admittance diagram for explaining the difference between an application range of the second embodiment and that of the third embodiment.

FIG. 30 is an admittance diagram for explaining a different point in designing between the optical multilayer structure of the second embodiment (FIG. 25) and that of the third embodiment (FIGS. 28 and 29). The diagram shows the ranges of starting materials of the substrate which can be used in the case of the configuration in which $TiO_2$ (n=2.4) having the highest refractive index is used as the material of the first transparent layer 51 and $MgF_2$ (n=1.38) having the lowest refractive index is used as the material of the second transparent layer 52, and in the case of the configuration in which $MgF_2$ (n=1.38) is used as the material of the first transparent layer 51A and $TiO_2$ (n=2.4) is used as the material of the second transparent layer 52A.

In FIG. 30, a first area A indicated by hatch lines which slant to the left corresponds to the case where the first transparent layer 51A having a low refractive index and the second transparent layer 52A having a high refractive index are formed on the substrate 50 (that is, the optical multilayer structure 3 or 4 in FIG. 28 or 29). Examples of the substrate material corresponding to the first area A include carbon (C), silicon (Si), germanium (Ge), and tantalum (Ta). On the other hand, a second area B indicated by hatch lines which slant to the right corresponds to the case where the first transparent layer 51 having a high refractive index, the second transparent layer 52 having a low refractive index, the gap portion 53, and the third transparent layer 54 having a high refractive index are formed on the substrate 50 (that is, the optical multilayer structure 2 in FIG. 25). In the second area B, the configuration in which the gap portion 53 is between the substrate 50 and the first transparent layer 51 or between the second transparent layer 52 and the third transparent layer 54. Examples of the substrate material corresponding to the second area B include, in addition to Cr described above, Ti and Nb.

When the refractive index of the substrate 50 is $n_m$ and the extinction coefficient is $k_m$ (zero in the case of a transparent substrate) at the wavelength $\lambda$ of incident light, the first area A applied to the optical multilayer structures 3 and 4 in FIGS. 28 and 29 satisfies the foregoing expressions (11) and (12).

On the other hand, the second area B applied to the optical multilayer structure 2 of FIG. 25 is an area satisfying the relations of the above expressions (9) and (10), while do not satisfying the relations of the expressions (11) and (12). In the case of the optical multilayer structure 3 (FIG. 28) having the configuration of the substrate/low refractive index layer/gap portion/high refractive index layer or the optical multilayer structure 4 (FIG. 29) having the configuration of substrate/gap portion/low refractive index layer/high refractive index layer, when the refractive index n is in a range from 1.90 to 5.76, the transparent substrate having the extinction coefficient k=0 also satisfies the relations of the expressions (11) and (12). Consequently, a transparent substrate made of glass, plastic, or the like, other than a metal, can be also applied.

When a material having a high refractive index and a lower (n) value or a material having a low refractive index and a higher (n) value is used, the range becomes narrower. In the case of a material having a value outside of the range, although there is a solution, the number of layers increases.

EXAMPLES

Figure 31:
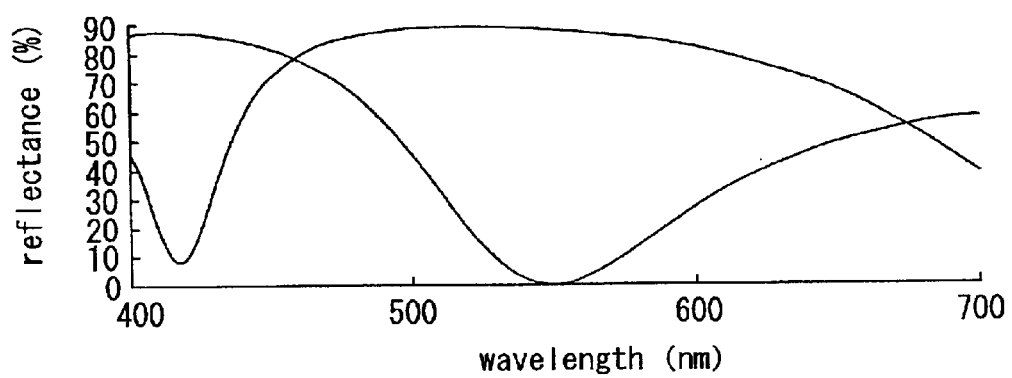
FIG. 31 is a diagram showing reflection characteristics of the optical multilayer structure illustrated in FIG. 25.

FIG. 31 shows the relation between the wavelength (design wavelength 550 nm) of incident light and the reflectance in the case where Cr ($n_m$=3.12, k=4.42) is used as the material of the substrate 50, a $TiO_2$ film ($n_1$=2.32) is used as the first transparent layer 51, an $SiO_2$ film (n=1.46) is used as the second transparent layer 52, an air layer (n=1.00) is used as the gap portion 53, and a $TiO_2$ film is used as the third transparent layer 54. In this case, characteristic in the case where the optical film thickness of the gap portion (air layer) is "0" and "$\lambda/4$" are shown.

Figure 32A:
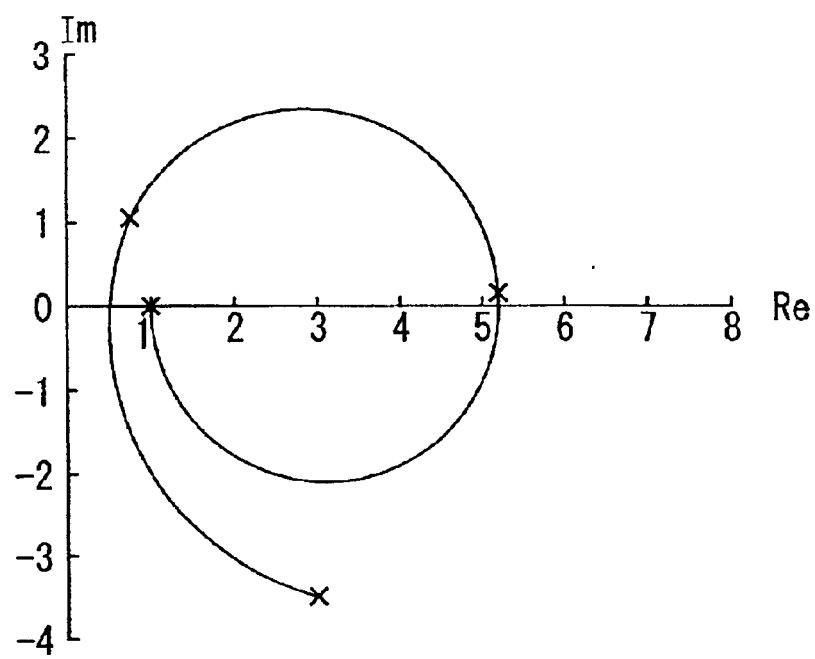
FIGS. 32A and 32B are diagrams for explaining optical admittance of the optical multilayer structure shown in FIG. 25.
Figure 32B:
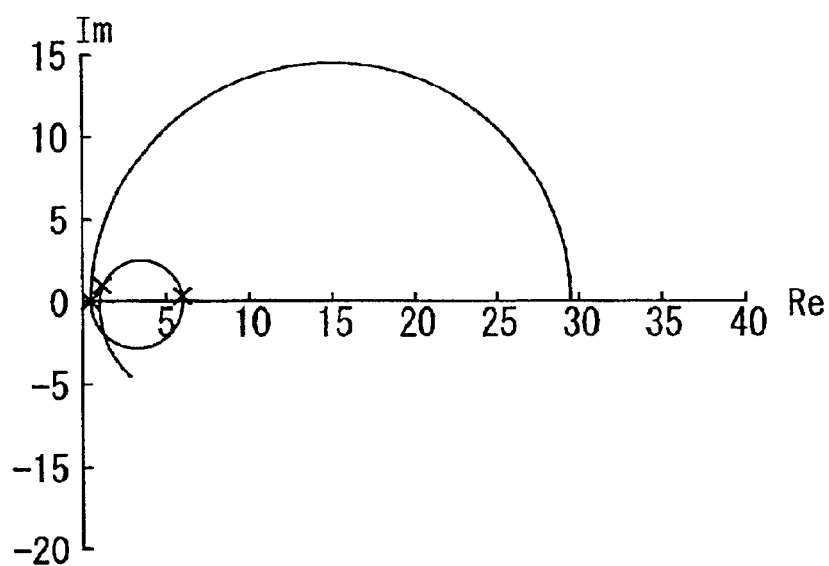

FIGS. 32A and 32B are admittance diagrams of this case. FIG. 32A shows the characteristic when the optical film thickness of the gap portion (air layer) is "0" (that is, the characteristic at the time of low reflection). FIG. 32B shows the characteristic when the optical film thickness of the gap portion (air layer) is "$\lambda/4$" (that is, the characteristic at the time of high reflection).

As obviously understood from the characteristic diagram of FIG. 31, in the optical multilayer structure 2 shown in FIG. 25, when the optical film thickness of the gap portion (air layer) 53 is "$\lambda/4$", a high reflection characteristic is demonstrated for incident light (k=550 nm). When the optical film thickness of the gap portion 53 is 0, a low reflection characteristic is demonstrated.

Figure 33:
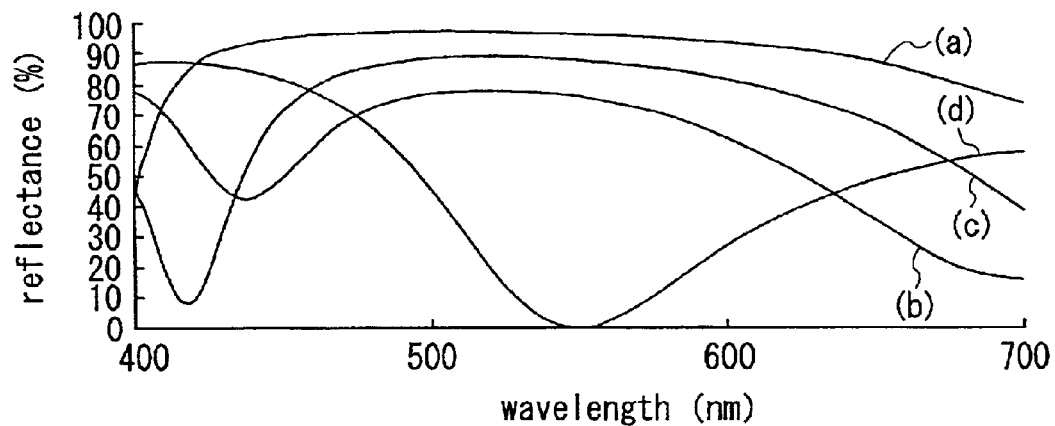
FIG. 33 is a diagram for explaining variations in reflection characteristics according to positions of a gap layer in the second embodiment.
Figure 34:
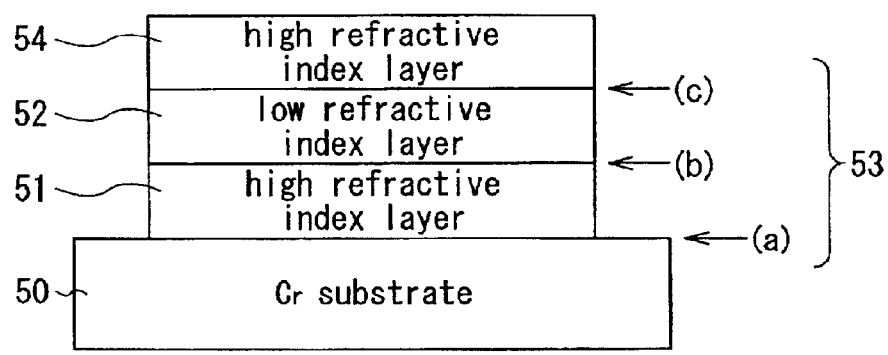
FIG. 34 is a diagram for explaining the position of the gap layer in correspondence with FIG. 33.

Further, FIGS. 33 and 34 show the state that the reflectance characteristic at the time of high reflectance in the optical multilayer structure 2 in FIG. 25 varies according to the position of the gap portion 53. In FIG. 33, (a) indicates the characteristic in the case where the gap portion 53 is provided between the substrate 50 and the first transparent layer (high refractive index layer) 51, (b) indicates the characteristic in the case where the gap portion 53 is provided between the first transparent layer (high refractive index layer) 51 and the second transparent layer (low refractive index layer) 52, and (c) indicates the characteristic in the case where the gap portion 53 is provided between the second and third transparent layers 52 and 54 (corresponding to the examples of FIGS. 25, 31, and 32). With respect to the reflectance characteristic at the time of high reflectance, the configuration (a) is the best, the second best is the configuration (c), and the configuration (b) follows. (d) demonstrates a reflectance characteristic at the time of low reflectance.

Figure 35:
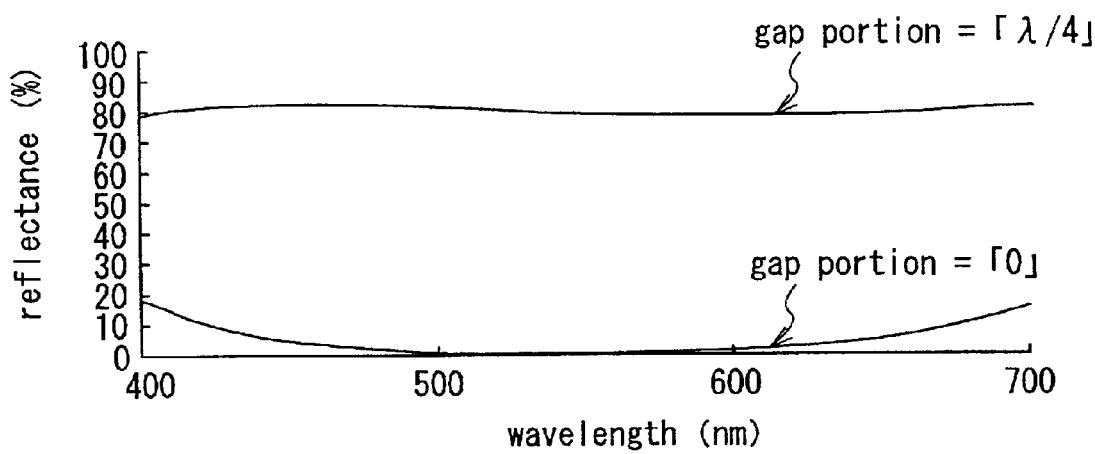
FIG. 35 is a diagram showing reflection characteristics of the optical multilayer structure illustrated in FIG. 28.

FIG. 35 shows the reflection characteristic of incident light (design wavelength of 550 nm) when, in the optical multilayer structure 3 of the configuration shown in FIG. 28, tantalum (Ta) ($n_m$=2.46, k=1.90) is used as the material of the substrate 50A, an $MgF_2$ film ($n_1$=1.38) is used as the first transparent layer (low refractive index layer) 51A, a $TiO_2$ film (n=2.32) is used as the second transparent layer (high refractive index layer) 52A, and an air layer (n=1.00) is used as the gap portion 53A disposed between the first and second transparent layers 51A and 52A. In this case, the characteristics in the case where the optical film thicknesses of the gap portion (air layer) are "0" and "$\lambda/4$".

Figure 36A:
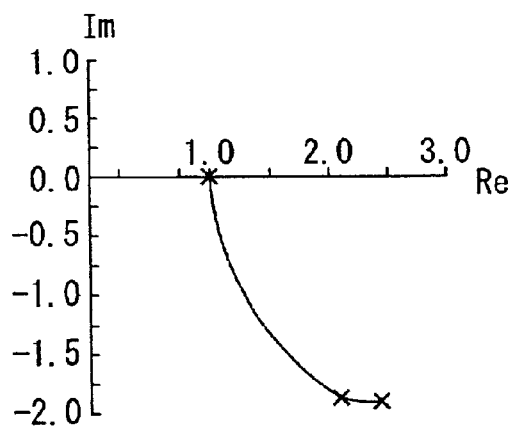
FIGS. 36A and 36B are diagrams for explaining optical admittance of the optical multilayer structure shown in FIG. 28.
Figure 36B:
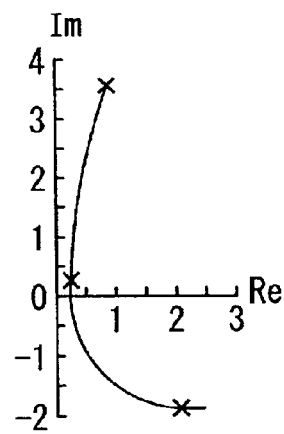

FIGS. 36A and 36B are admittance diagrams of this case. FIG. 36A shows the characteristic when the optical film thickness of the gap portion (air layer) is "0" (that is, the characteristic at the time of low reflection). FIG. 36B shows the characteristic when the optical film thickness of the gap portion (air layer) is "$\lambda/4$" (that is, the characteristic at the time of high reflection).

Figure 37:
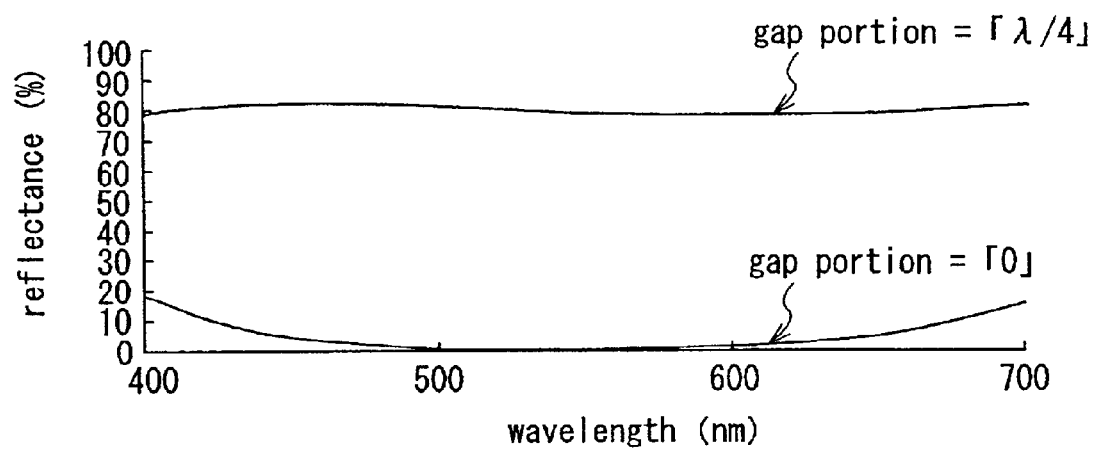
FIG. 37 is a diagram showing reflection characteristics of the optical multilayer structure illustrated in FIG. 29.
Figure 38:
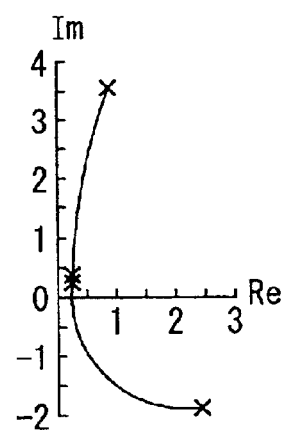
FIG. 38 is a diagram for explaining optical admittance of the optical multilayer structure shown in FIG. 29.

FIG. 37 shows the reflection characteristic of incident light (design wavelength of 550 nm) when, in the optical multilayer structure 3 of the configuration shown in FIG. 29, tantalum (Ta) ($n_m$=2.46, k=1.90) is used as the material of the substrate 50A, an $MgF_2$ film ($n_1$=1.38) is used as the first transparent layer (low refractive index layer) 51A, a $TiO_2$ film (n=2.32) is used as the second transparent layer (high refractive index layer) 52A, and an air layer (n=1.00) is used as the gap portion 53A disposed between the substrate 50A and the first transparent layer 51A. In this case as well, the characteristics in the case where the optical film thicknesses of the gap portion (air layer) are "0" and "$\lambda/4$" are shown. FIG. 38 is an admittance diagram when the optical film thickness is "$\lambda/4$".

As understood that, with each of the configurations of FIGS. 35 and 36, when the optical film thickness of the gap portion (air layer) 53A is "$\lambda/4$", a high reflection characteristic is demonstrated for incident light ($\lambda$=550 nm). When the optical film thickness of the gap portion 53A is 0, a low reflection characteristic is demonstrated. The configurations have almost the same characteristics.

In the optical multilayer structures 2 to 4 of the second and third embodiments, for example, also in a visible light region of, for example, 550 nm, modulation of high contrast can be performed. Moreover, since the configuration is simple and a movable portion moving range is at most "$\lambda/2$" or "$\lambda/4$", high response can be realized. By using any of the optical multilayer structures, a high speed optical switching device and a high speed image display can be realized.

Figure 39:
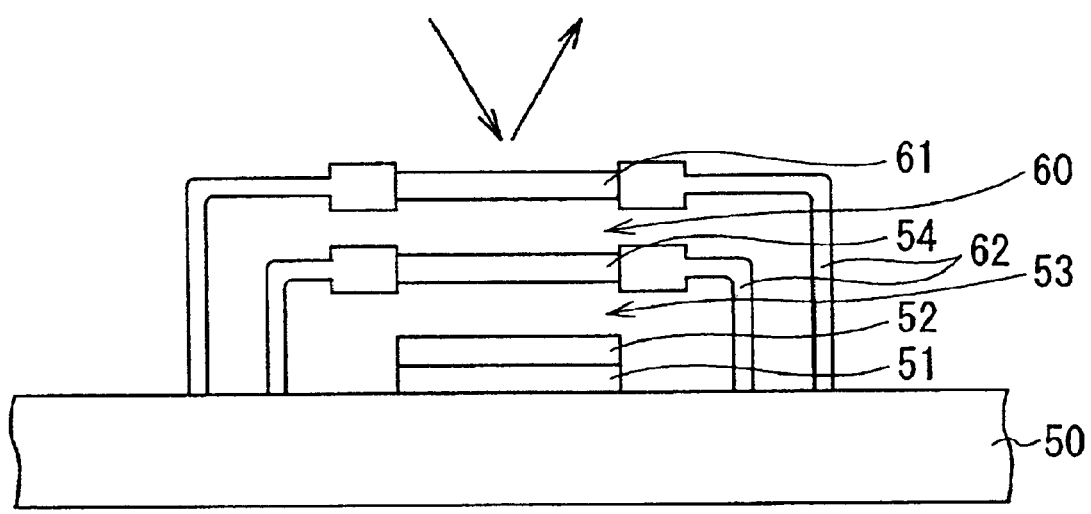
FIG. 39 is a diagram for explaining a modification of the second embodiment.

Although the gap portion in the optical multilayer structure is a single layer in the foregoing embodiment, it can consists of a plurality of layers, for example, two layers as shown in FIG. 39. Specifically, the first transparent layer 51, second transparent layer 52, first gap portion 53, third transparent layer 54, second gap layer 60, and third transparent layer 61 are sequentially stacked on the substrate 10, and the second transparent layer 53 and the third transparent layer 61 are supported by, for example, supporting member 62 made of silicon nitride.

In the optical multilayer structure, the second transparent layer 52 as an intermediate layer is displaced in the vertical direction, one of the first and second gap portions 53 and 60 is accordingly narrowed, and the other gap portion is widened, thereby changing the reflection characteristic.

Since the driving method of each of the optical multilayer structures 2, 3, and 4 according to the second and third embodiments is substantially the same as that in the first embodiment, its description will not be repeated.

By any of the optical multilayer structures 2, 3, and 4 according to the second and third embodiments as well, in a manner similar to the first embodiment, with a simple configuration, high-response optical switching device and image display can be realized.

Fourth Embodiment

Figure 40:
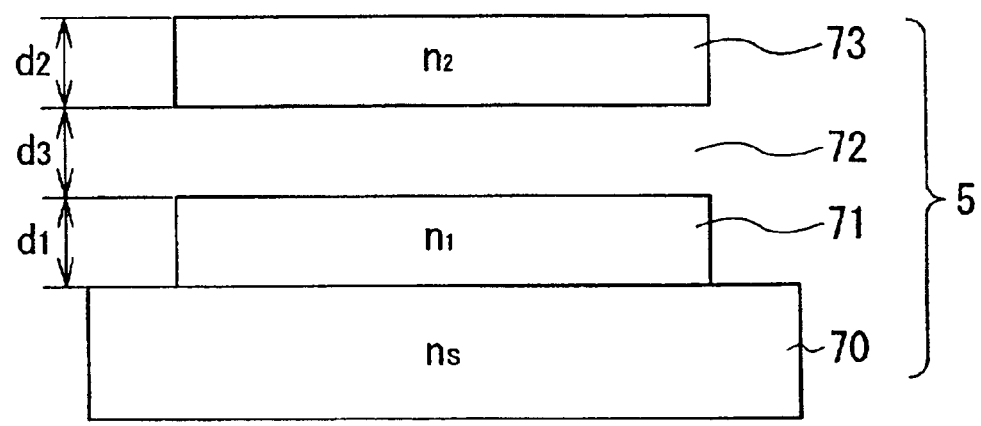
FIG. 40 is a cross section showing the configuration when a gap layer in an optical multilayer structure according to a fourth embodiment is "λ/4".
Figure 41:
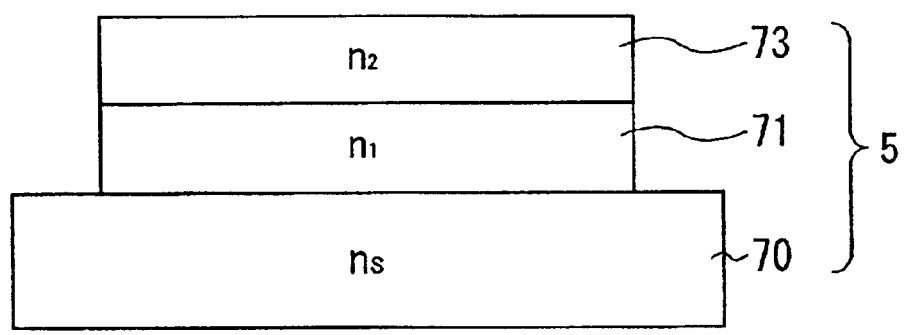
FIG. 41 is a cross section showing the configuration when the gap layer in the optical multilayer structure in FIG. 40 is "0".

Each of FIGS. 40 and 41 shows a basic configuration of an optical multilayer structure 5 according to a fourth embodiment of the invention. FIG. 40 shows a state where the gap portion 12 which will be described hereinlater exists in the optical multilayer structure 5, and FIG. 41 shows a state where there is no gap portion in the optical multilayer structure 5. In a manner similar to the foregoing embodiments, the optical multilayer structure 5 is also used as, concretely for example, an optical switching device. By arranging a plurality of optical switching devices in a one-dimensional array, an image display can be constructed.

The optical multilayer structure 5 of the embodiment is constructed by stacking, on a substrate 70 made of, for example, a non-metal transparent material, a first transparent layer 71 in contact with the transparent substrate 70, a gap portion 72 having a changeable size capable of causing an optical interference phenomenon, and a third second transparent layer 73.

When a refractive index of the transparent substrate 70 is $n_s$, a refractive index of the first transparent layer 71 is $n_1$, and a refractive index of the second transparent layer 73 is $n_2$, they are set so that the following expressions (13) and (14) are satisfied. Specifically, in the optical multilayer structure 5, with respect to the refractive indices, on the transparent substrate 70, the first transparent layer 71 having a refractive index higher than that of the substrate, the gap portion 72, and the second transparent layer 73 having a refractive index lower than that of the first transparent layer 71 are stacked in this order.

$$n_s < n_1, \text{ and } n_1 > n_2 \tag{13}$$

$$n_2 = n_1/\sqrt{n_s} \tag{14}$$

The reason why the expression (14) is set as a requirement is as follows.

In FIG. 5A, composite admittance of the optical multilayer structure is $Y_1 = n_1^2/n_s$, $Y_3' = n_2^2/Y_1 = n_2^2 \cdot n_s/n_1$. To realize such a characteristic, it is sufficient to set that $Y_3'$=1.0 (admittance of air). It is therefore sufficient to satisfy $n_2^2 \cdot n_s/n_1^2 = 1.0$, that is, $n_2 = n_1/\sqrt{n_s}$. When the refractive indices do not strictly satisfy the relation, it can be compensated by adjusting a film thickness or the like to a some extent.

As specific materials of the substrate 70, for example, a transparent glass substrate or transparent plastic substrate is used. Concrete materials of the first transparent layer 71 include titanium oxide (TiO$_2$) (n$_1$=2.4), silicon nitride (Si$_3$N$_4$) (n$_1$=2.0), zinc oxide (ZnO) (n$_1$=2.0), niobium oxide (Nb$_2$O$_5$) (n$_1$=2.2), tantalum oxide (Ta$_2$O$_5$) (n$_1$=2.1), silicon oxide (SiO) (n$_1$=2.0), stannic oxide (SnO$_2$) (n$_1$=2.0), and ITO (Indium-Tin Oxide) (n$_1$=2.0). Concrete materials of the second transparent layer 13 include silicon oxide (SiO$_2$) (n$_2$=1.46), bismuth oxide (Bi$_2$O$_3$) (n$_2$=1.91), magnesium fluoride (MgF$_2$) (n$_2$=1.38), and alumina (Al$_2$O$_3$) (n$_2$=1.67).

Each of the optical film thicknesses d$_1$ and d$_2$ of the first and second transparent layers 71 and 72 is equal to "λ/4" or "an odd multiple of λ/4" (λ denotes a wavelength of incident light). The film thicknesses d$_1$ and d$_2$ are not strictly equal to "λ/4", but may be approximately equal to "λ/4" for the following reason. For example, when the film thickness d$_1$ of the first transparent layer 71 becomes thicker than λ/4, it can be compensated by, for example, reducing the thickness of the second transparent layer 73. Even when the refractive index is deviated from the expression (14) more or less, it may be adjusted by the film thickness. In this case, each of the film thicknesses d$_1$ and d$_2$ is slightly deviated from λ/4 in a manner similar to the other embodiments. Therefore, the expression "λ/4" includes "approximately λ/4".

Each of the first and third layers 71 and 73 may take the form of a composite layer constructed by two or more layers having optical characteristics different from each other. In this case, the optical characteristics (optical admittance) of the composite layer have to be equivalent to those in the case of a single layer.

The gap portion 72 is set to that its optical size (the interval between the first layer 71 and the second layer 73) can be varied by driving means described hereinlater. A medium filling the gap portion 72 may be gas or liquid as long as it is transparent. Examples of the gas are air (having a refractive index n$_D$=1.0 with respect to sodium D ray (589.3 nm)), nitrogen (N$_2$) (n$_D$=1.0) and the like. Examples of the liquid are water (n$_D$=1.333) silicone oil (n$_D$=1.4 to 1.7), ethyl alcohol (n$_D$=1.3618), glycerin (n$_D$=1.4730), diiodomethane (n$_D$=1.737), and the like. The gap portion 72 may be in a vacuum state.

The optical size of the gap portion 72 changes in a binary manner or continuously between "an odd multiple of λ/4" and "an even multiple of λ/4 (including 0)". Accordingly, the amount of reflection or transmission of incident light changes in a binary manner or continuously. Like the case of the first and second layers 71 and 73, even when the optical size is slightly deviated from a multiple of λ/4, it can be compensated by a slight change in the film thickness or refractive index of the other layer. Consequently, the expression of "λ/4" includes "approximately λ/4".

In the optical multilayer structure 5, by changing the optical size of the gap portion 72, the amount of reflection or transmission of light entering from either the transparent substrate 70 side or the side opposite to the transparent substrate 70 is changed. Concretely, the optical size of the gap portion 72 is changed between an odd multiple of λ/4 and an even multiple of λ/4 (including 0) (for example, between "λ/4" and "0") in a binary manner or continuously, an amount of reflection or transmission of incident light is changed.

EXAMPLE

Figure 42A:
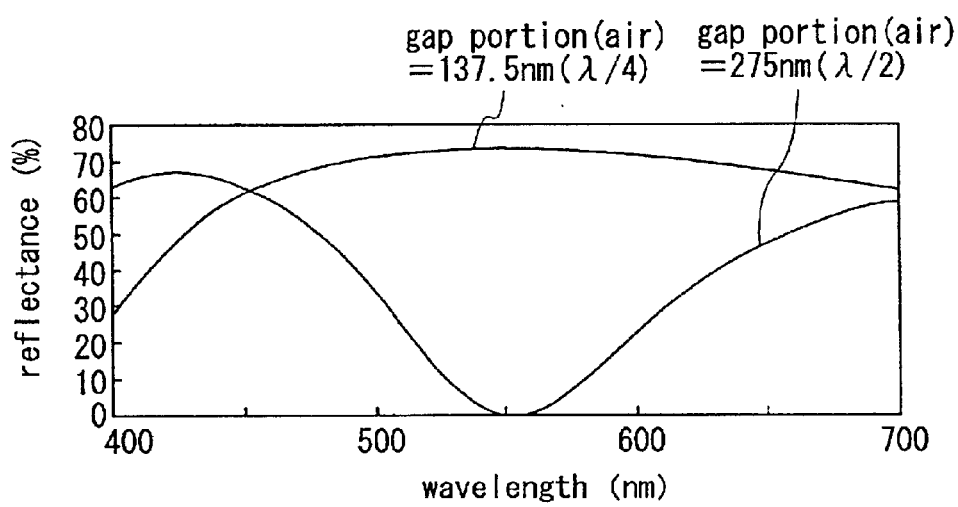
FIGS. 42A and 42B are diagrams showing reflection characteristics of the optical multilayer structure illustrated in FIG. 40.
Figure 42B:
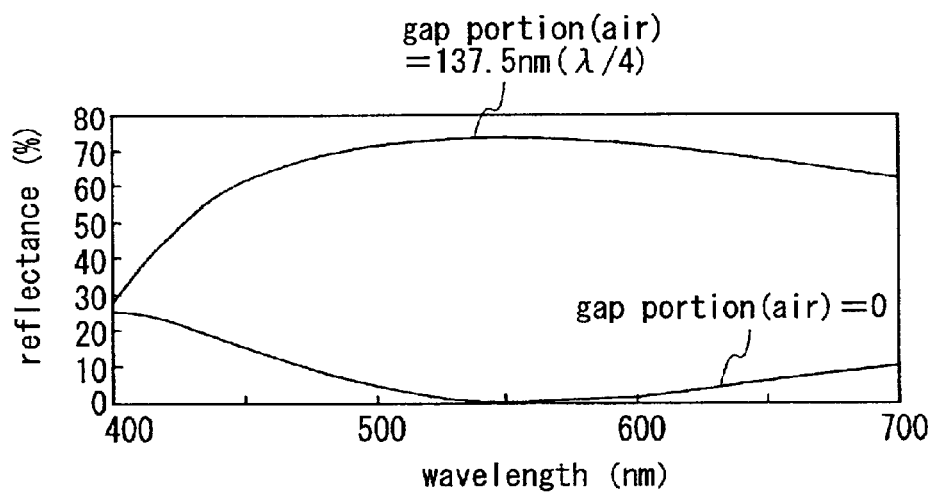

FIGS. 42A and 42B show the relation between the wavelength (design wavelength of 550 nm) of incident light and the reflection when, in the optical multilayer structure 5, a glass substrate (n$_s$=1.52) is used as the transparent substrate 10, a TiO$_2$ film (n$_1$=2.32) is used as the first transparent layer 71, an air layer (n$_D$=1.00) is used as the gap layer 72, and a Bi$_2$O$_3$ film (refractive index n$_2$=1.92) is used as the second transparent layer 73. In this case, FIG. 42A shows the characteristics in the case where the optical film thicknesses of the gap portion (air layer) are "λ/2" (physical thickness= 275 nm) and "λ/4" (137.5 nm). FIG. 42B shows the characteristics in the case where the optical film thicknesses of the gap portion (air layer) are "0" and "λ/4".

Figure 43A:
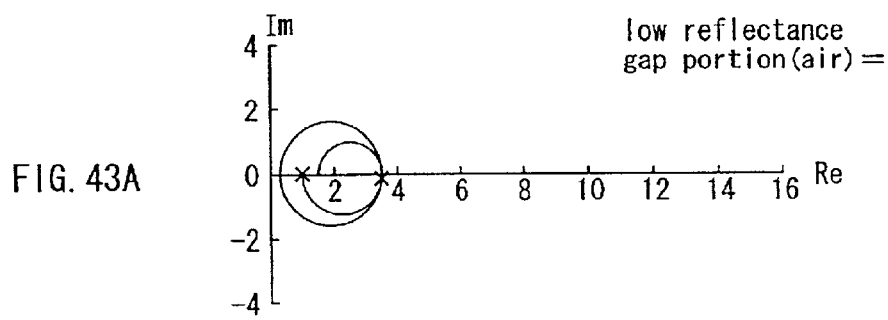
FIGS. 43A to 43C are diagrams for explaining the reflection characteristics (optical admittance) of FIG. 42.
Figure 43B:
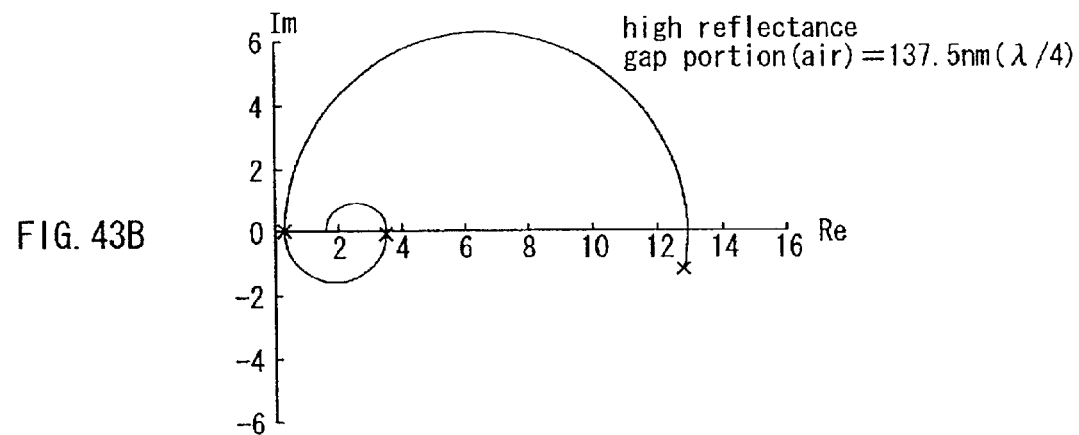
Figure 43C:
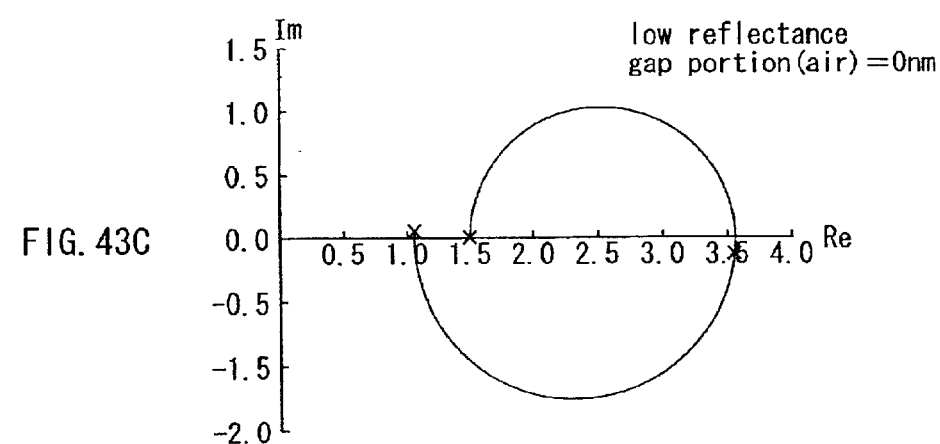

FIGS. 43A to 43C are optical admittance diagrams. FIG. 43A shows the characteristic in the case where the optical film thickness of the gap portion (air layer) is "λ/2". FIG. 43B shows the characteristic in the case where the optical film thickness of the gap portion (air layer) is "λ/4". FIG. 43C shows the characteristic in the case where the optical film thickness of the gap portion (air layer) is "0".

As understood from the characteristics diagrams shown in FIGS. 42A and 42B, in the optical multilayer structure 5, when the optical film thickness of the gap portion (air layer) 72 is "λ/2", a low reflection characteristic is demonstrated for incident light (wavelength λ). When the optical film thickness of the gap portion 72 is "λ/4", a high reflection characteristic is demonstrated., When the optical film thickness of the gap portion 72 is 0, a low reflection characteristic is demonstrated. That is, when the optical film thickness of the gap portion 72 is switched between an odd multiple of "λ/4" and an even multiple of "λ/4" including 0, the high reflectance characteristic and the low reflectance characteristic are alternately demonstrated. Even in the case of the low reflectance characteristic as well, when the optical film thickness is "λ/2", a V-coat reflectance characteristic is demonstrated at a specific wavelength (550 nm). When the optical film thickness becomes "0", the V-shape characteristic becomes gentle and than close to flat, so that the band of reflectance of 0% becomes wider.

In the embodiment, also in a visible light region of, for example, 550 nm, modulation of high contrast can be performed. Moreover, since the configuration is simple and a movable portion moving range is at most "λ/2", high response can be realized. By using the optical multilayer structure 5, a high speed optical switching device and a high speed image display can be realized.

Fifth Embodiment

Figure 44:
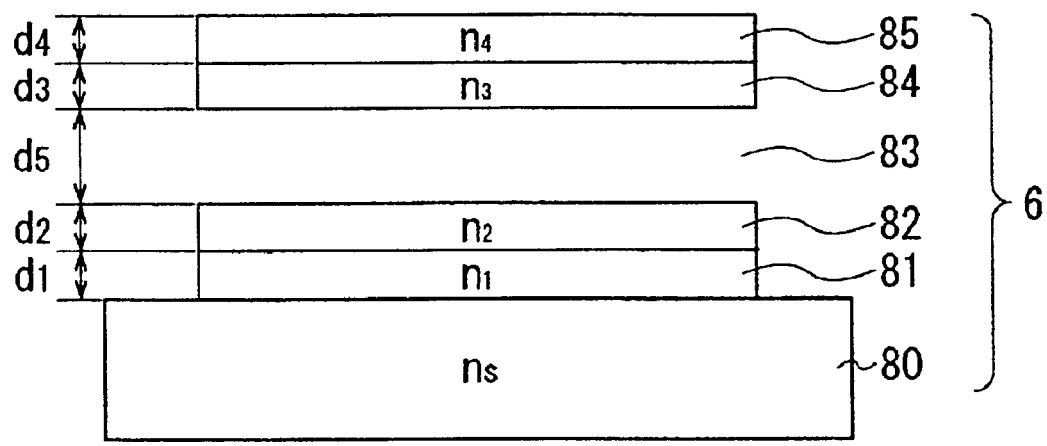
FIG. 44 is a cross section showing the configuration when a gap layer in an optical multilayer structure according to a fifth embodiment is "λ/4".
Figure 45:
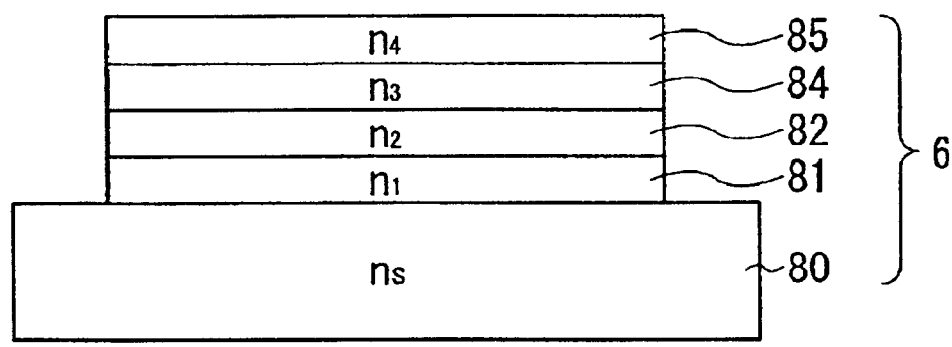
FIG. 45 is a cross section showing the configuration when the gap layer in the optical multilayer structure in FIG. 44 is "0".

By referring to FIGS. 44 and 45, a fifth embodiment of the invention will now be described. In the fifth embodiment, the reflection characteristic can be almost evenly changed in a wide wavelength range having a predetermined width (flat range).

An optical multilayer structure 6 is constructed by stacking, on a transparent substrate 80 made of, for example, a non-metal transparent material, a first transparent layer 81 in contact with the transparent substrate 80, a second transparent layer 82, a gap portion 83 having a changeable size capable of causing an optical interference phenomenon, a third transparent layer 84, and a fourth transparent layer 85. FIG. 44 shows a state where the gap portion 83 which will be described hereinlater in the optical multilayer structure 6 exists. FIG. 45 shows a state where there is no gap portion in the optical multilayer structure 6.

In the embodiment, when refractive indices of the substrate 80, the first transparent layer, the second transparent layer, the third transparent layer, and the fourth transparent layer are n$_s$, n$_1$, n$_2$, n$_3$, and n$_4$, they are set so as to satisfy the relations of the following expression (15).

$$n_s < n_1 < n_2 \approx n_3, \text{ and } n_4 < n_1 \tag{15}$$

As specific materials, for example, a transparent glass substrate or transparent plastic substrate is used as the transparent substrate 80, an $Al_2O_3$ film ($n_1$=1.67) is used as the first transparent layer 81, a $TiO_2$ film ($n_2$=2.4) is used as the second transparent layer 82, a $TiO_2$ film ($n_3$=2.4) is used as the third transparent layer 84, and an $MgF_2$ film ($n_4$=1.38) is used as the fourth transparent layer 85. Each of optical film thicknesses $n_1d_1$, $n_2d_2$, $n_3d_3$, and $n_4d_4$ of the first to fourth transparent layers 81 to 85 is either "λ/4" or "an odd multiple of λ/4" (λ denotes a wavelength of incident light).

Each of the first to fourth layers 81 to 85 may take the form of a composite layer constructed by two or more layers having optical characteristics different from each other. In this case, the optical characteristic (optical admittance) in the composite layer has to have characteristics equivalent to those in the case of a single layer.

The gap portion 83 is set so that its size (the interval between the second transparent layer 82 and the third transparent layer 84) can be varied by driving means described hereinlater in a manner similar to the gap portion 72 in the first embodiment. A medium filling the gap portion 83 is similar to that in the case of the gap portion 72.

In the optical multilayer structure 6, Expression (15) is satisfied. Consequently, the reflection characteristic can be obtained in a wide range and, by changing the size of the gap portion 83, the amount of reflection or transmission of light incident on the transparent substrate 80 side or the side opposite to the transparent substrate 80 is changed. More concretely, like the fourth embodiment, by changing the optical size of the gap portion 83 in a binary manner or continuously between "an odd multiple of λ/4" and "an even multiple of λ/4 (including 0)", the amount of reflection, transmission, or absorption of incident light is changed in a binary manner or continuously.

Figure 46:
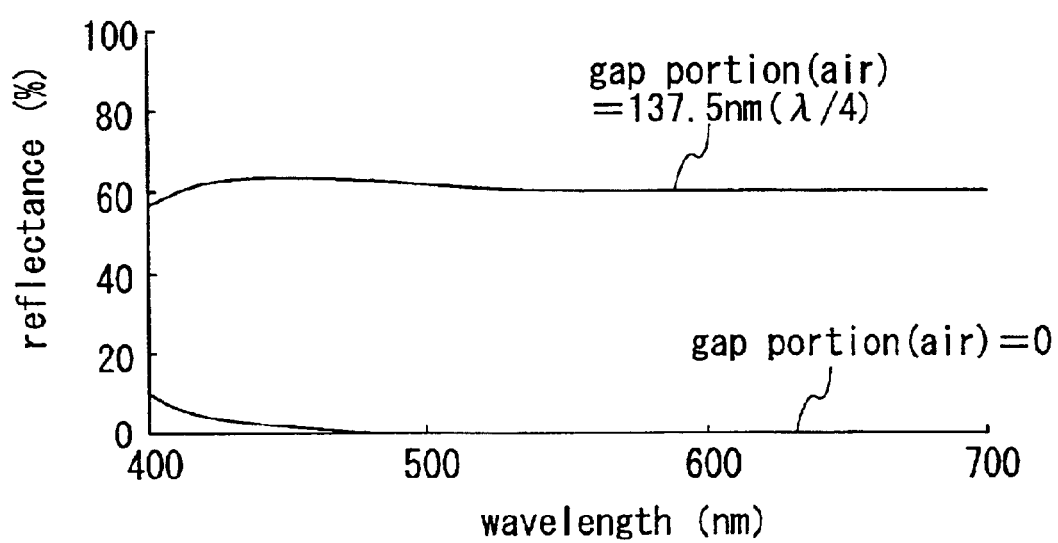
FIG. 46 is a diagram showing reflection characteristics of the optical multilayer structure illustrated in FIG. 44.

FIG. 46 is a characteristic diagram showing the relation between the wavelength (design wavelength) of incident light and reflectance in the case where a glass substrate (ns=1.52) is used as the transparent substrate 80, a composite layer of a $TiO_2$ film and an $MgF_2$ (magnesium fluoride) film (complex index of refraction $n_1$=1.7 corresponding to a composite film thickness λ/4) is used as the first transparent layer 81, a $TiO_2$ film (refractive index $n_2$=2.32) is used as the second transparent layer 82, an air layer is used as the gap portion 83, a $TiO_2$ film (refractive index n3=2.32) is used as the third transparent layer 84, and an $MgF_2$ film (refractive index n4=1.38) is used as the fourth transparent layer 85. FIG. 46 shows both the characteristic in the case where the optical film thickness of the gap portion (air layer) 83 is "λ/4" and that in the case where the optical film thickness of the gap portion (air layer) 83 is "0".

Figure 47A:
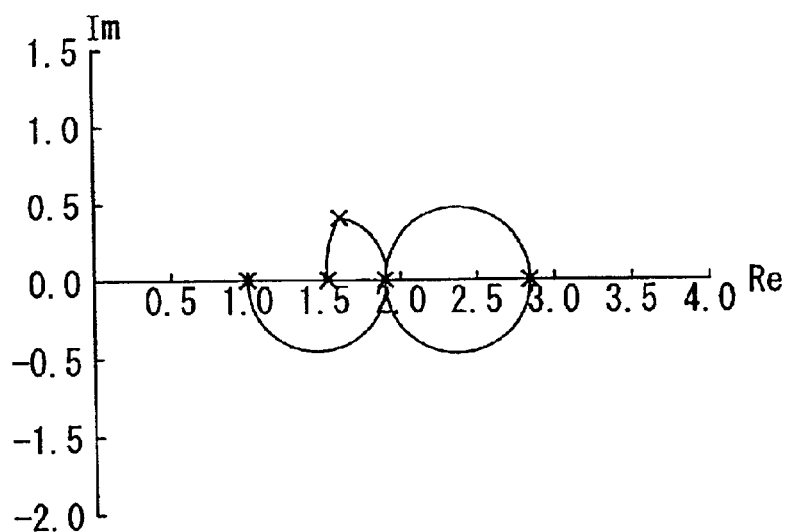
FIGS. 47A and 47B are diagrams for explaining the reflection characteristics (optical admittance) of the optical multilayer structure of FIG. 46.
Figure 47B:
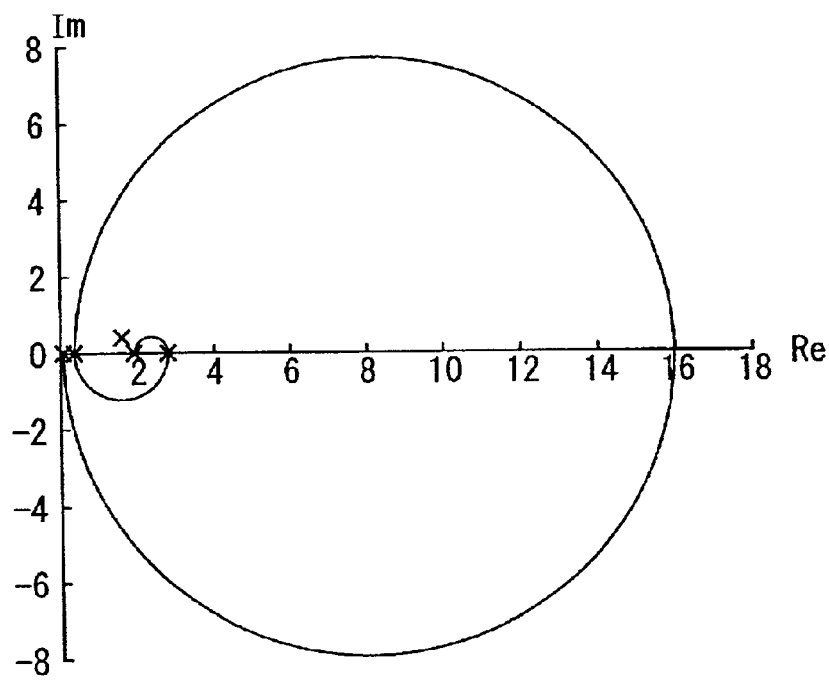

FIGS. 47A and 47B are optical admittance diagrams. FIG. 47A shows the case where the optical film thickness of the gap portion (air layer) 83 is "0" and FIG. 47B shows the case where the optical film thickness of the gap portion (air layer) 83 is "λ/4".

As obviously understood from the characteristic diagram of FIG. 46, in the optical multilayer structure 6 of the embodiment, when the optical film thickness of the gap portion (air layer) 83 is "λ/4", a high reflection characteristic (approximately 60%) is demonstrated in a wide range. When the optical film thickness of the gap portion 83 is "0", a low reflection characteristic which is flat in a wide range is demonstrated.

[Modification]

Figure 48:
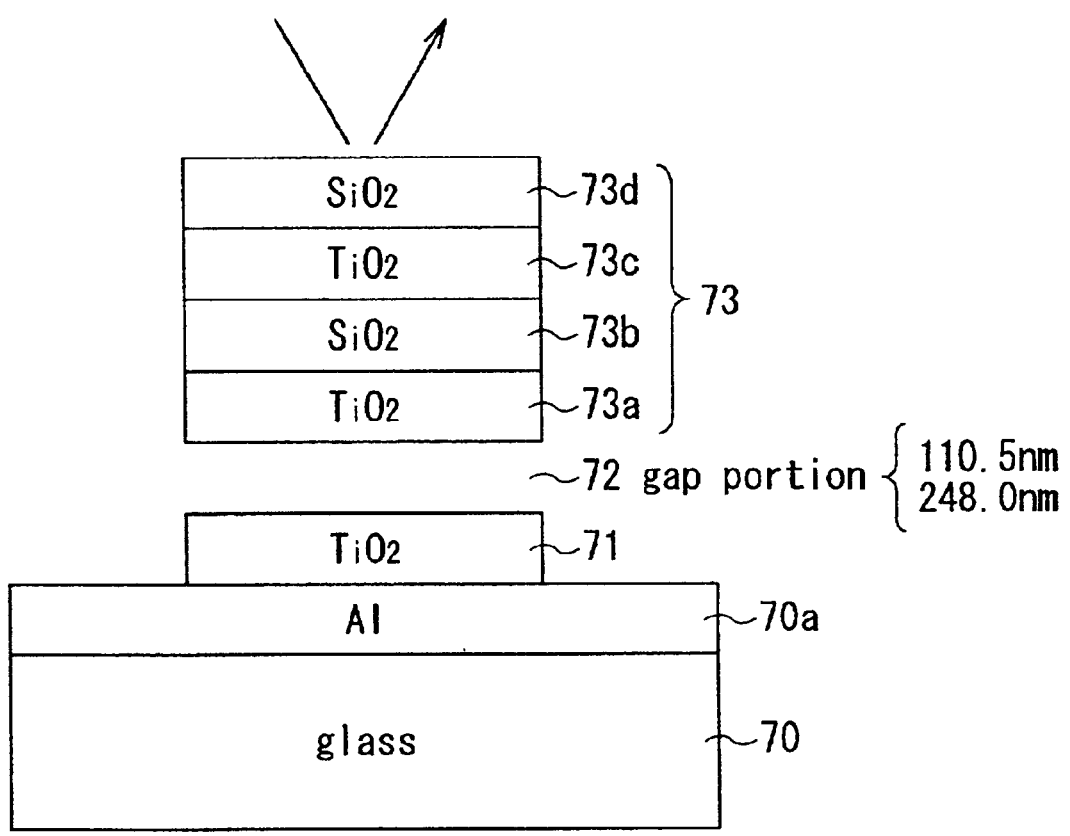
FIG. 48 is a cross section for explaining a modification of the fourth embodiment.

An optical multilayer structure shown in FIG. 48 is formed by stacking a metal film, such as an aluminum (Al) layer 70a having a thickness of 100 nm or more, a $TiO_2$ film having a thickness of 52.67 nm as the first transparent layer 71, and a multilayer film, as the second transparent layer 73, consisting of a $TiO_2$ film 73a having a thickness of 32.29 nm, an $SiO_2$ film 73b having a thickness of 114.72 nm, a $TiO_2$ film 73c having a thickness of 53.08 nm, and an $SiO_2$ film 73d having a thickness of 19.53 nm. When the aluminum layer 70a becomes 100 nm thick or thicker, it hardly transmits light. When an antireflection film is provided for the non-transmitting film, it means that reflection is zero and all of light is absorbed by the aluminum layer 70a. Further, because of the characteristic of aluminum itself, reflectance of about 10% in a high reflection state when the characteristic of antireflection deteriorates can be easily realized by the smaller number of layers from a design viewpoint.

Figure 49:
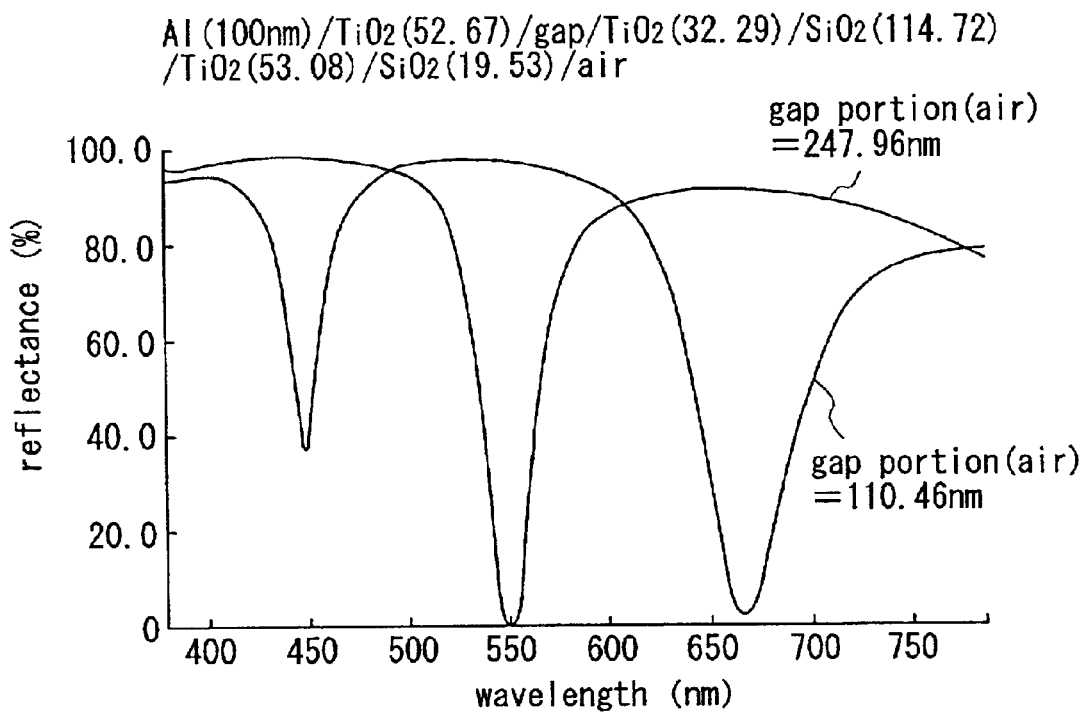
FIG. 49 is a diagram showing reflection characteristics of the optical multilayer structure of FIG. 48.
Figure 50:
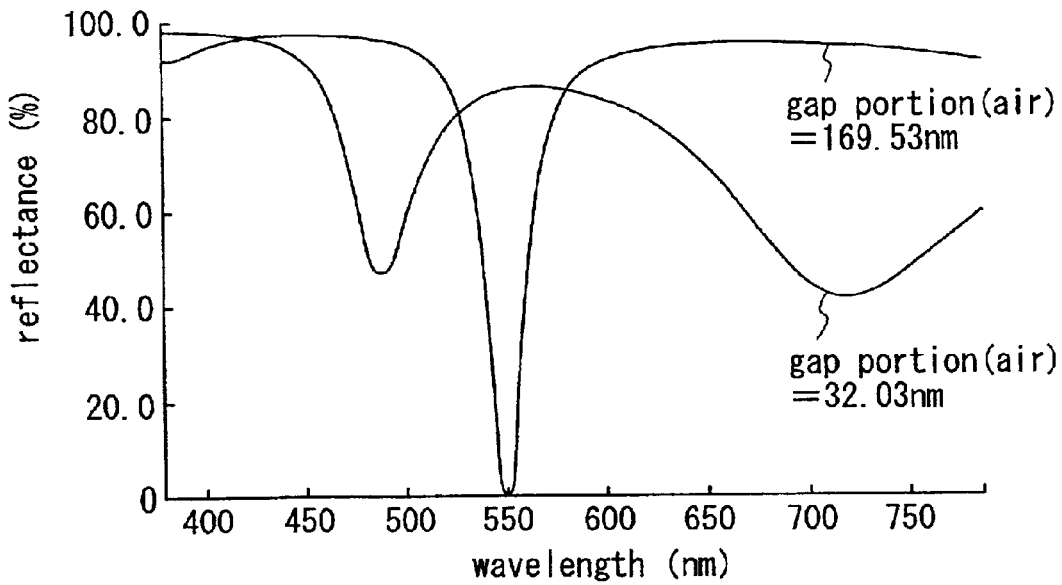
FIG. 50 is a diagram showing reflection characteristics of the optical multilayer structure of FIG. 48.

FIG. 49 shows the result of simulation when the gap portion 72 is changed in the optical multilayer structure. Incident light enters from the side opposite to the aluminum layer 70a (the side of the $SiO_2$ film 73d as the uppermost layer). Even when the position of the gap portion 72 is changed to the $SiO_2$ film 73b which is the second layer from the uppermost layer, similar characteristics can be obtained. FIG. 50 shows a reflection characteristic in this case. The design wavelength is 550 nm and the thicknesses of the layers are shown in the diagram.

Figure 51:
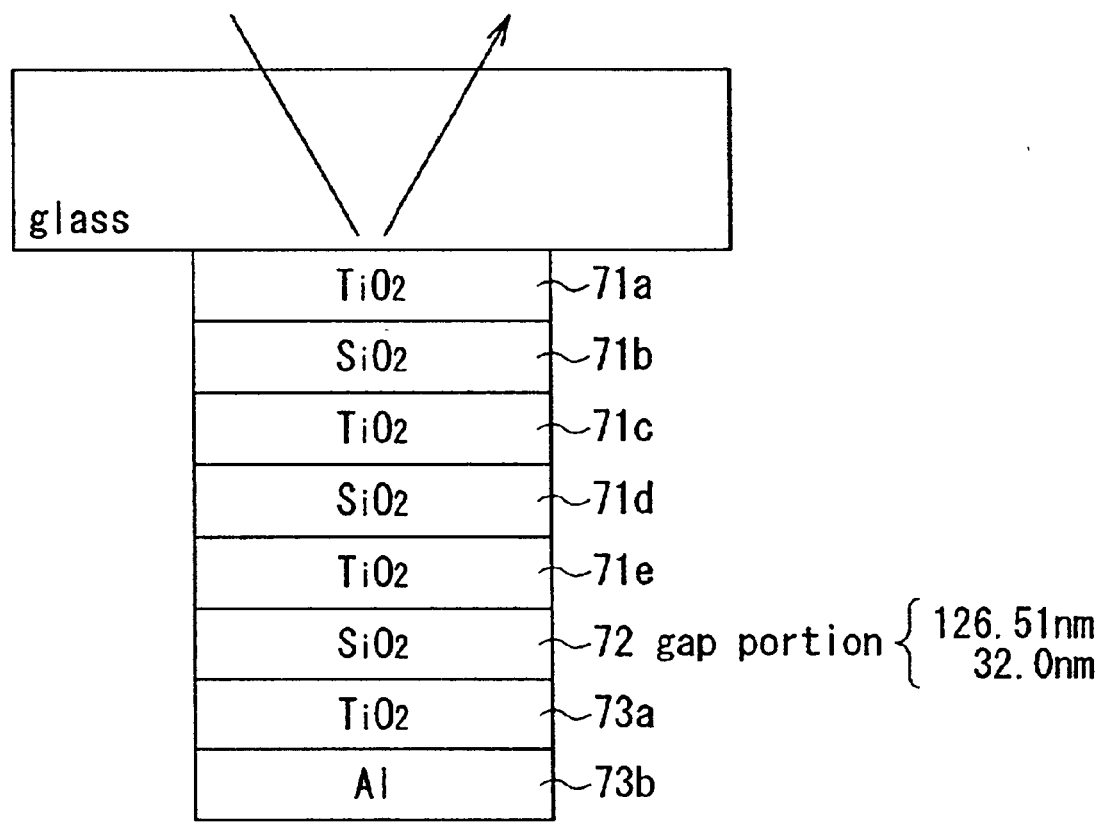
FIG. 51 is a cross section for explaining another modification of the fourth embodiment.
Figure 52:
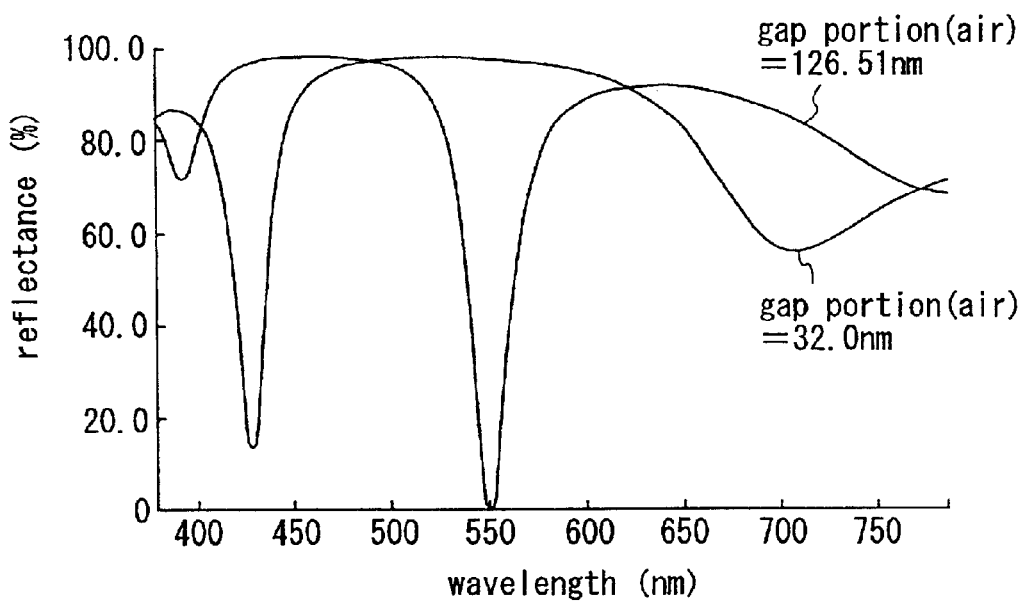
FIG. 52 is a diagram showing (simulated) reflection characteristics of the optical multilayer structure of FIG. 51.
Figure 53:
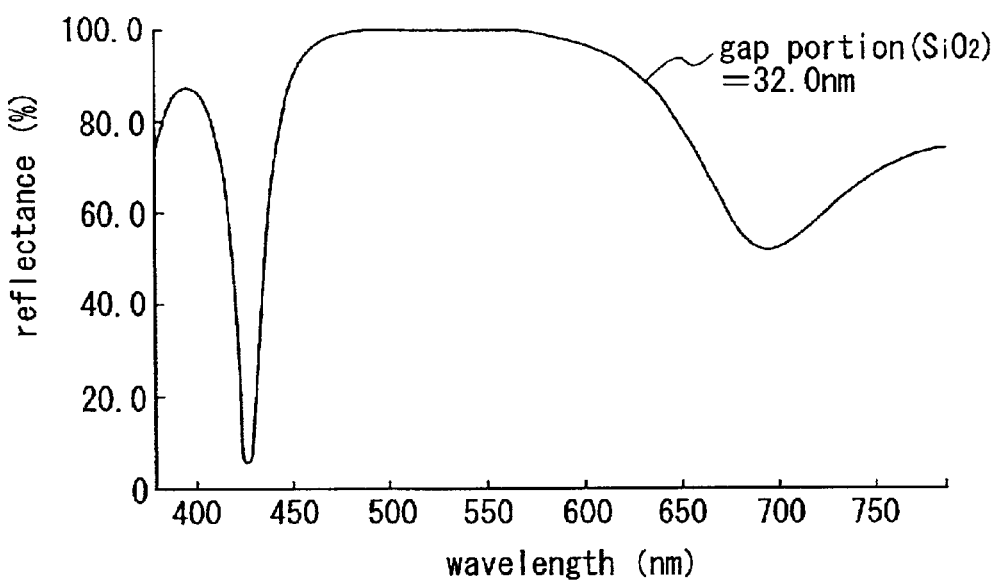
FIG. 53 is a diagram showing reflection characteristics (actual measurement values) of the optical multilayer structure of FIG. 51.
Figure 54:
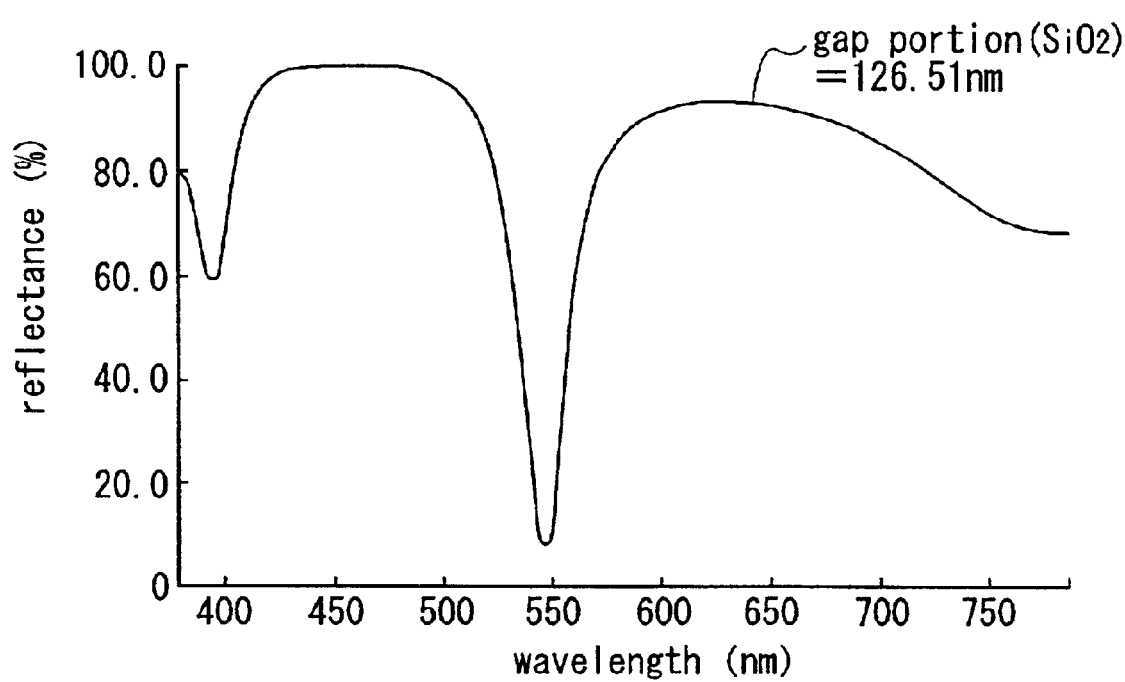
FIG. 54 is a diagram showing reflection characteristics (actual measurement values) of the optical multilayer structure of FIG. 51.

Although the gap portion 72 in FIGS. 49 and 50 is assumed as air or vacuum having a refractive index of 1.0, a complicated process is necessary to form it in an experiment. Consequently, an experiment was conducted by using $SiO_2$ as a material of a low refractive in place of the gap portion. The film configuration is as shown in FIG. 51, and FIG. 52 shows the result of the simulation. Measurement results of the actually formed structures are shown in FIGS. 53 and 54. It is understood from the drawings that the result of simulation and the result of actual measurement coincide well with each other. Since the light is set to enter from the glass substrate side, a measurement value of reflectance of about 4% on the surface is large. Other than that, controlling a film thickness while optically monitoring the film thickness during film formation can prevent some deviation.

Figure 55:
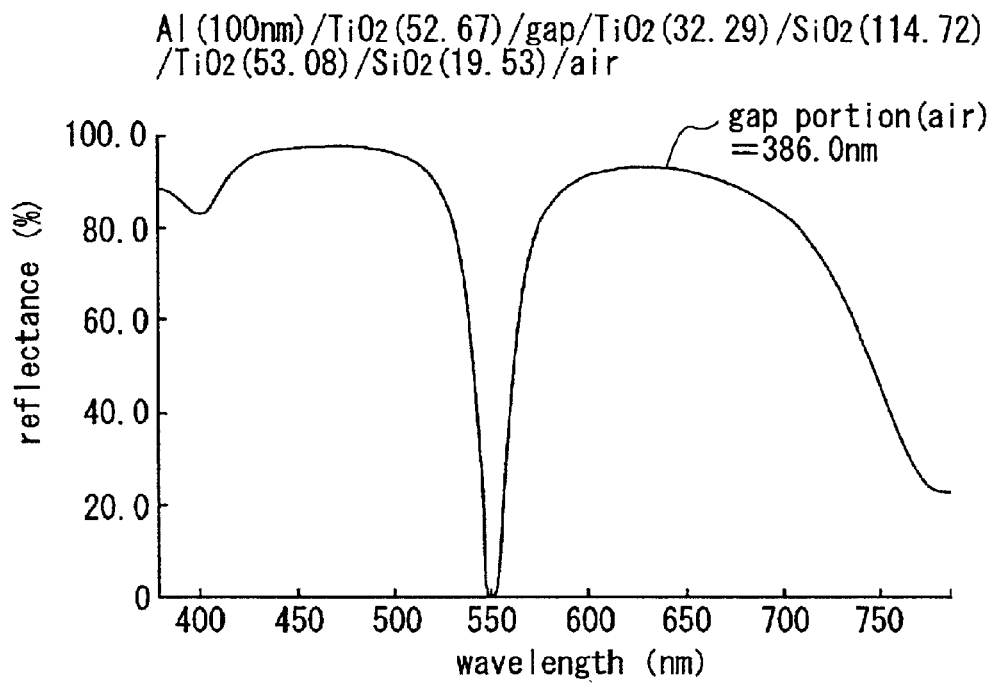
FIG. 55 is a diagram showing another reflection characteristics of the optical multilayer structure in FIG. 48.
Figure 56:
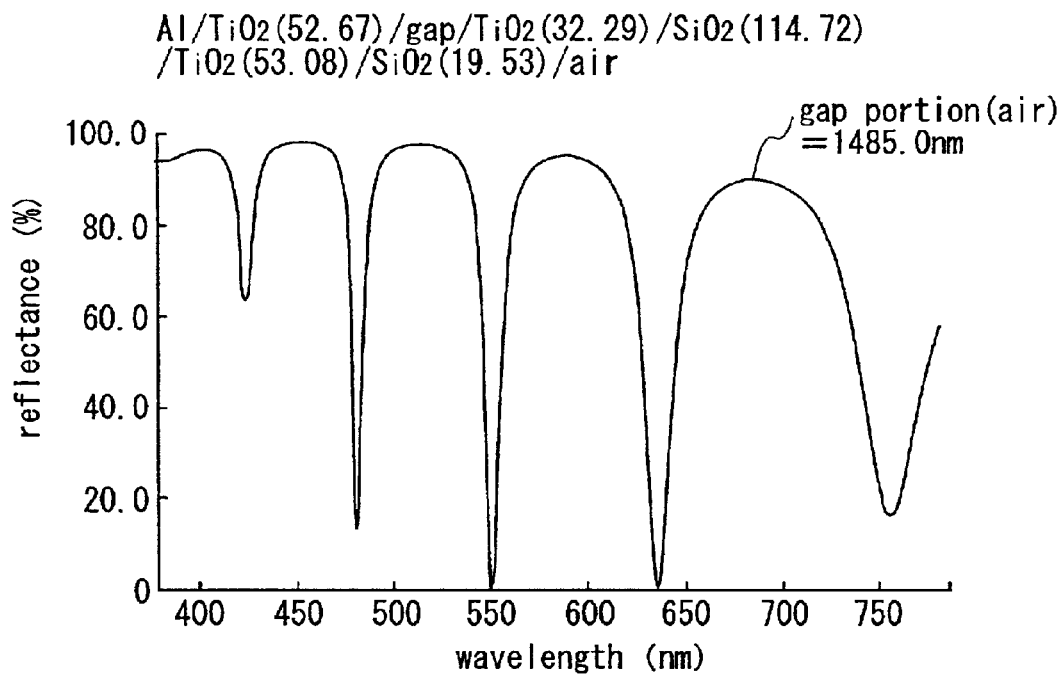
FIG. 56 is a diagram showing another reflection characteristics of the optical multilayer structure in FIG. 48.

FIG. 55 shows the reflection characteristic in the case where the gap portion 72 in the optical multilayer structure shown in FIG. 48 is set to 386 nm. FIG. 56 shows the reflection characteristic i the case where the gap portion 72 is set to 1485 nm. It is understood that the width of the low reflection range in each of FIGS. 55 and 56 is narrower than that in the example (the gap portion 72 of 110.46 nm) of FIG. 49. That is, the wider the gap portion 72 becomes, the narrower the low reflection range becomes. The margin at the time of manufacture is accordingly narrow, so that handling becomes very difficult. The size of the gap portion 72 is narrower than 1500 nm, preferably, 500 nm. With such a size, the fabrication is not so difficult.

Figure 57:
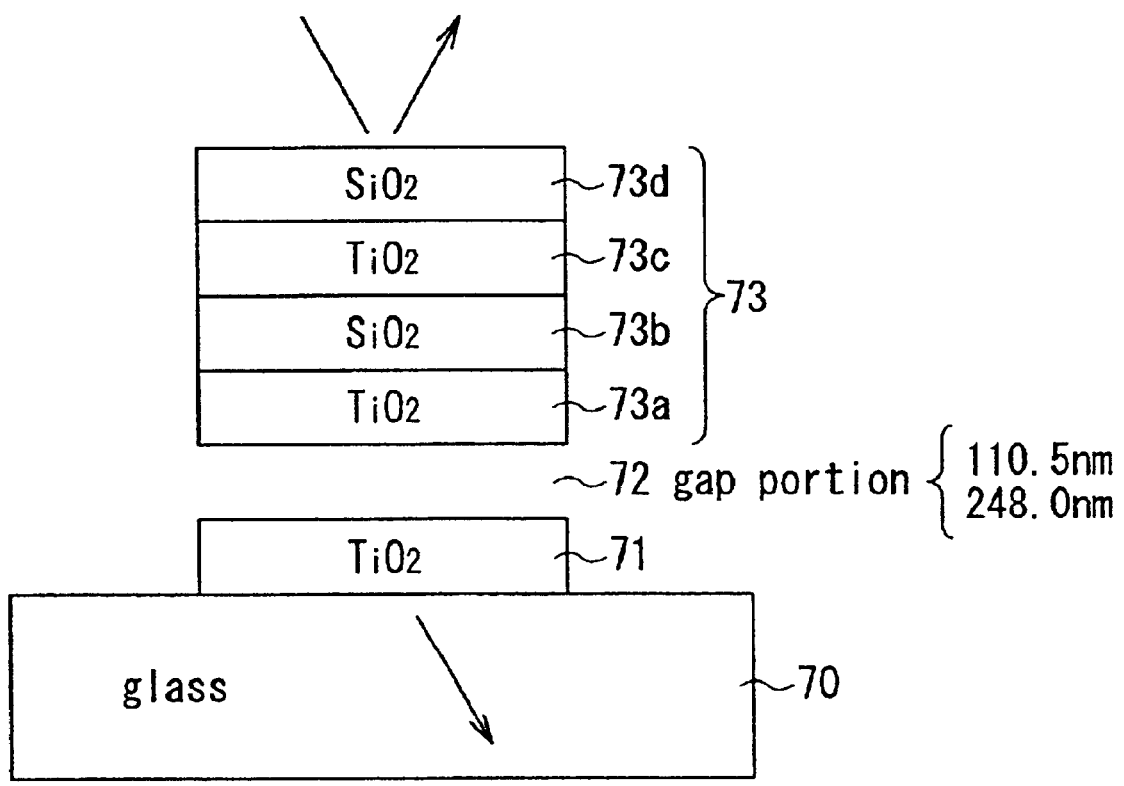
FIG. 57 is a cross section for explaining further another modification of the fourth embodiment.
Figure 58:
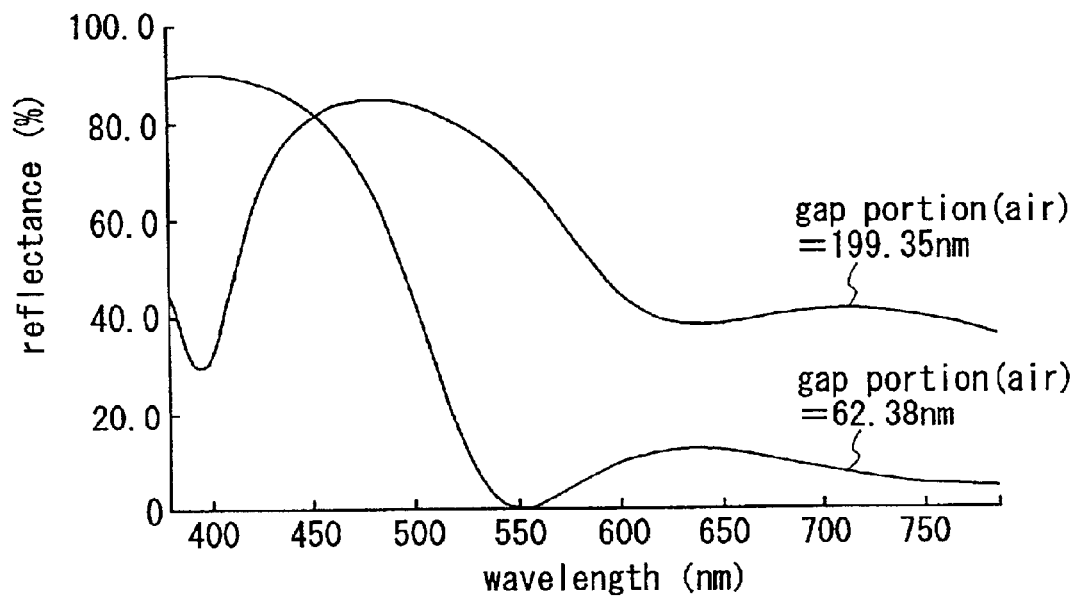
FIG. 58 is a diagram showing (simulated) reflection characteristics of the optical multilayer structure of FIG. 57.

An optical multilayer structure shown in FIG. 57 is formed by directly stacking a $TiO_2$ film having a thickness of 40.89 nm as the first transparent layer 71, and a multilayer film, as the second transparent layer 73. The multilayer film consists of a $TiO_2$ film 73a having a thickness of 32.62 nm, an $SiO_2$ film 73b having a thickness of 77.14 nm, a $TiO_2$ film 73c having a thickness of 39.40 nm, and an $SiO_2$ film 73d having a thickness of 163.13 nm. FIG. 58 shows the result of simulation with a design wavelength of 550 nm. Different from the example of FIG. 48, the light absorption film (aluminum layer) is not provided on the transparent substrate 70, so that the reflectance in the reflection band is low. However, transmission light passes through the multilayer structure without being absorbed, thereby enabling the structure itself from being heated.

Figure 59:
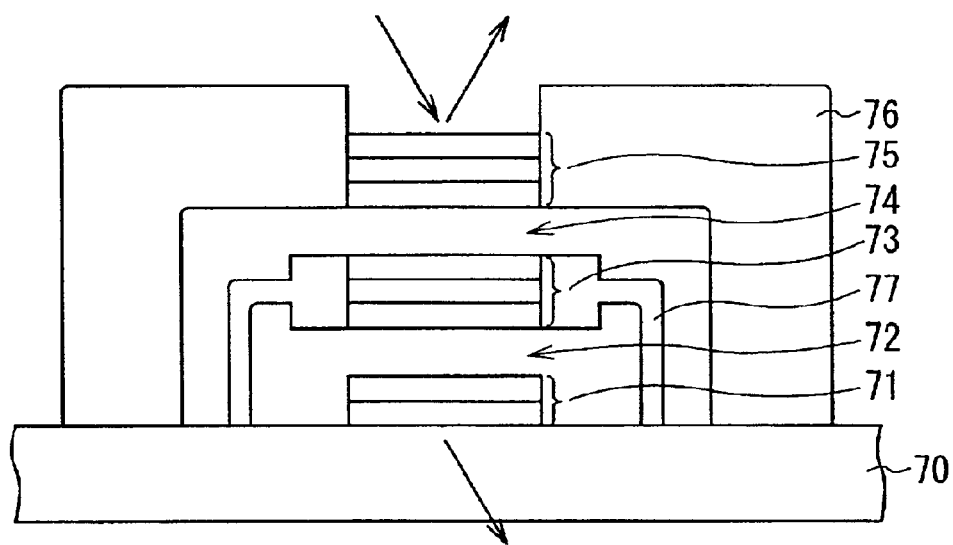
FIG. 59 is a cross section for explaining further another modification of the fourth embodiment.

Although the gap portion in the optical multilayer structure is a single layer in any of the foregoing embodiments, it can be a multilayer of, for example, two layers as shown in FIG. 59. Specifically, on the transparent substrate 70, the first transparent layer 71, first gap portion 72, second transparent layer 73, second gap portion 74, and third transparent layer 75 are formed in accordance with this order, and the second and third transparent layers 73 are supported by supporting members 77 and 76 made of, for example, silicon nitride, respectively. In the optical multilayer structure, the second transparent layer 73 as an intermediate layer is displaced vertically, one of the first and second gap portions 72 and 74 is narrowed, and the other gap portion is accordingly widened, thereby changing the reflection characteristic.

Since methods of driving the optical multilayer structures 4 and 5 are similar to that of the first embodiment, their description will not be repeated.

Obviously many modifications and variations of the present invention are possible in the light of the above teachings. It is therefore to be understood that within the scope of the appended claims the invention may be practiced otherwise than as specifically described.

What is claimed is:

1. An optical multilayer structure comprising:
    a substrate;
    a light-absorbing first layer;
    a gap portion having a changeable size capable of causing an optical interference phenomenon; and
    a second layer;
    wherein when a complex index of refraction of the substrate is $N_s$ ($=n_s-i\cdot k_s$, where $n_s$ denotes a refractive index, $k_s$ denotes an extinction coefficient, and i represents an imaginary unit), a complex index of refraction of the first layer is $N_1$ ($=n_1-i\cdot k_1$, where $n_1$ denotes a refractive index, and $k_1$ denotes an extinction coefficient), a refractive index of the second layer is $n_2$, and a refractive index of an incident medium is 1.0, the relation of the following Expression (1) is satisfied $$\{(n_1-(n_2^2+1)/2)^2+k_1^2-((n_2^2-1)/2)^2\}\{(n_s-(n_2^2+1)/2)^2+k_s^2-((n_2^2-1)/2)^2\}<0 \quad (1).$$

2. An optical multilayer structure according to claim 1, wherein the first layer, the gap portion, and the second layer are stacked in accordance with this order on the substrate.

3. An optical multilayer structure according to claim 1, wherein the second layer is made of a transparent material.

4. An optical multilayer structure according to claim 1, wherein the substrate is a light-absorbing substrate or a substrate on which a light absorbing film is formed.

5. An optical multilayer structure according to claim 1, wherein the substrate is made of a transparent material or a translucent material.

6. An optical multilayer structure according to claim 1, further comprising driving means for changing an optical size of the gap portion,
    wherein the size of the gap portion is changed by the driving means, thereby changing an amount of reflection, transmission, or absorption of incident light.

7. An optical multilayer structure according to claim 6, wherein the optical size of the gap portion is changed by the driving means in a binary manner or continuously between an odd multiple of λ/4 and an even multiple λ/4 (including 0), thereby changing the amount of reflection, transmission, or absorption of incident light in a binary manner or continuously.

8. An optical multilayer structure according to claim 1, wherein at least one of the first and second layers is a composite layer made of two or more layers having optical characteristics different from each other.

9. An optical multilayer structure according to claim 3, wherein the second layer is a silicon nitride film.

10. An optical multilayer structure according to claim 9, wherein the second layer is made by a silicon nitride layer and a transparent conductive layer.

11. An optical multilayer structure according to claim 6, wherein at least one of the first and second layers partly includes a transparent conductive layer, and the driving means changes the optical size of the gap portion by an electrostatic force generated by application of a voltage to the transparent conductive film.

12. An optical multilayer structure according to claim 11, wherein the transparent conductive film is made of ITO, $SnO_2$, or ZnO.

13. An optical multilayer structure according to claim 1, wherein the gap portion is filled with air, transparent gas, or transparent liquid.

14. An optical multilayer structure according to claim 1, wherein the gap portion is in vacuum.

15. An optical multilayer structure according to claim 1, wherein the light-absorbing first layer is made of any one of metal, metal oxide, metal nitride, carbide, and semiconductor.

16. An optical multilayer structure according to claim 4, wherein the light-absorbing substrate or light-absorbing thin film is made of any one of metal, metal oxide, metal nitride, carbide, and semiconductor.

17. An optical multilayer structure according to claim 1, wherein an optical thickness of the second layers is λ/4 or less (λ: design wavelength of incident light).

18. An optical multilayer structure according to claim 1, wherein the first layer is made of silicon and the optical thickness of the second layer is λ/2 or less (λ: design wavelength of incident light).

19. An optical multilayer structure according to claim 1, wherein the substrate is made of carbon, graphite, carbide, or a transparent material, and the optical thickness of the second layer is λ/4 or less (λ: design wavelength of incident light).

20. An optical multilayer structure according to claim 1, wherein the substrate is made of carbon, graphite, carbide, or a transparent material, the first layer is made of silicon, and the optical thickness of the second layer is λ/4 or less (λ: design wavelength of incident light).

21. An optical multilayer structure according to claim 6, wherein the driving means changes an optical size of the gap portion by using a magnetic force.

22. An image display for displaying a two-dimensional image by irradiating a plurality of optical switching devices arranged one-dimensionally or two-dimensionally with light,
    the optical switching device comprising:
    an optical multiplayer structure having a substrate, a light-absorbing first layer, a gap portion having a changeable size capable of causing an optical interference phenomenon, and a second layer; and
    driving means for changing an optical size of the gap portion.

* * * * *